(12) United States Patent
Jiang et al.

(10) Patent No.: US 11,798,222 B2
(45) Date of Patent: Oct. 24, 2023

(54) VIRTUAL SCENE SWITCHING METHOD AND APPARATUS, TERMINAL DEVICE, AND STORAGE MEDIUM

(71) Applicant: Tencent Technology (Shenzhen) Company Limited, Shenzhen (CN)

(72) Inventors: Huifu Jiang, Shenzhen (CN); Feng Xue, Shenzhen (CN); Nan Liu, Shenzhen (CN); Yifan Guo, Shenzhen (CN); Yaning Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 708 days.

(21) Appl. No.: 17/002,731

(22) Filed: Aug. 25, 2020

(65) Prior Publication Data

US 2020/0388070 A1    Dec. 10, 2020

Related U.S. Application Data

(63) Continuation of application No. PCT/CN2019/093806, filed on Jun. 28, 2019.

(30) Foreign Application Priority Data

Jul. 5, 2018   (CN) .......................... 201810731410.1

(51) Int. Cl.
*G06T 15/20*   (2011.01)
*G06T 7/73*    (2017.01)
(Continued)

(52) U.S. Cl.
CPC ................ *G06T 15/20* (2013.01); *G06T 7/75* (2017.01); *G06T 19/20* (2013.01); *H04N 13/279* (2018.05);
(Continued)

(58) Field of Classification Search
CPC ........... G06T 15/20; G06T 7/75; G06T 19/20; G06T 2219/2021; G06T 19/003;
(Continued)

(56) References Cited

U.S. PATENT DOCUMENTS

2016/0299563 A1\*  10/2016  Stafford ................ G06T 19/006

FOREIGN PATENT DOCUMENTS

CN       102760205 A    10/2012
CN       105069846 A    11/2015
(Continued)

OTHER PUBLICATIONS

Tencent Technology, ISR, PCT/CN2019/093806, Sep. 19, 2019, 2 pgs.

(Continued)

*Primary Examiner* — Christopher M Brandt
(74) *Attorney, Agent, or Firm* — Morgan, Lewis & Bockius LLP

(57) ABSTRACT

Embodiments of this application disclose a virtual scene switching method and apparatus, a terminal device, and a storage medium, to improve the service adaptability of a portal, improve the application scenario of the portal, and enhance traversal experience of a user. In this method, when a terminal device determines that a relative position between a target virtual object and a target scene switching trigger meets a predetermined position relationship, it may be determined that the target virtual object intends to pass through the target scene switching trigger. In this case, the terminal device may add a target 3D model to a position of the target scene switching trigger, and a moving path of the target virtual object passing through the target scene switching trigger is lengthened in a manner similar to thickening the target scene switching trigger, to implicitly increase the thickness of the target scene switching trigger, and reducing (Continued)

or even eliminating an abrupt feeling during a traversal, to allow the target virtual object to experience an immersive traversal.

20 Claims, 12 Drawing Sheets

(51) Int. Cl.
*H04N 13/279* (2018.01)
*H04N 13/282* (2018.01)
*G06T 19/20* (2011.01)

(52) U.S. Cl.
CPC ... *H04N 13/282* (2018.05); *G06T 2219/2021* (2013.01)

(58) Field of Classification Search
CPC ..... G06T 17/00; G06T 19/006; H04N 13/279; H04N 13/282; G06F 3/017; G06F 3/011; A63F 13/52
See application file for complete search history.

(56) References Cited

FOREIGN PATENT DOCUMENTS

| CN | 107193364 A | 9/2017 |
|---|---|---|
| CN | 108114467 A | 6/2018 |

OTHER PUBLICATIONS

Tencent Technology, WO, PCT/CN2019/093806, Sep. 19, 2019, 4 pgs.
Tencent Technology, IPRP, PCT/CN2019/093806, Jan. 5, 2021, 5 pgs.

* cited by examiner

VIRTUAL SCENE SWITCHING METHOD AND APPARATUS, TERMINAL DEVICE, AND STORAGE MEDIUM

CROSS REFERENCE TO RELATED APPLICATIONS

This application is a continuation application of PCT Patent Application No. PCT/CN2019/093806, entitled "VIRTUAL SCENE CHANGE METHOD AND APPARATUS, TERMINAL DEVICE AND STORAGE MEDIUM" filed on Jun. 28, 2019, which claims priority to Chinese Patent Application No. 201810731410.1, entitled "VIRTUAL SCENE SWITCHING METHOD AND APPARATUS, TERMINAL DEVICE, AND STORAGE MEDIUM" filed Jul. 5, 2018, all of which are incorporated by reference in their entirety.

FIELD OF THE TECHNOLOGY

Embodiments of this application relate to the field of computer technologies, and in particular, to a virtual scene switching method and apparatus, a terminal device, and a storage medium.

BACKGROUND OF THE DISCLOSURE

With the rapid development of economy and technologies, the rise of the third largest industry on the Internet, and the upgrading of information technologies, the augmented reality (AR) technology is gradually known to the public, and various AR interactive system researches gradually become hot issues concerned by the public.

The AR technology is widely applied. One AR application is called AR portal. In an AR portal, a user may enter another world from a current world through a virtual door.

It is desirable to have an AR portal with perceivable thickness. Otherwise, the passing process would be extremely short, and the traveler would go from one world to another world abruptly and cannot experience an immersive traversal.

SUMMARY

Embodiments of this application provide a virtual scene switching method and apparatus, a terminal device, and a storage medium, to improve the service adaptability of an AR portal, improve the application scenario of the AR portal, and enhance traversal experience of a user.

According to a first aspect, a virtual scene switching method is performed by a terminal device having a processor and memory storing a plurality of computer programs to be executed by the processor, the method comprising:
  displaying, by the terminal device, a current virtual scene and a first scene switching trigger set, a scene switching trigger being used for triggering a switch between different associated virtual scenes, and the first scene switching trigger set being a set of scene switching triggers triggering a switch from the current virtual scene to at least one associated virtual scene;
  determining, by the terminal device, from the first scene switching trigger set, a target scene switching trigger of which a relative position to a target virtual object in the current virtual scene meets a predetermined position relationship;
  adding, by the terminal device, a target 3D model with a shape matching that of the target scene switching trigger to a position of the target scene switching trigger, to lengthen, by using the target 3D model, a moving path passing through the target scene switching trigger; and
  switching, by the terminal device, from the current virtual scene to a target virtual scene corresponding to the target scene switching trigger on the basis that the target virtual object passes through the target scene switching trigger.

In the foregoing technical solution, when it is determined that a relative position between the target virtual object and the target scene switching trigger meets a predetermined position relationship, it may be determined that the target virtual object intends to pass through the target scene switching trigger. In this case, a target 3D model may be added to a position of the target scene switching trigger, and a moving path of the target virtual object passing through the target scene switching trigger is lengthened in a manner similar to thickening the target scene switching trigger, which is similar to adding a shielding small house or another shelter to the target scene switching trigger by using the target 3D model, to implicitly increase the thickness of the target scene switching trigger, and alleviating or even eliminating an abrupt feeling during a traversal, so that the target virtual object experiences an immersive traversal, thus improving the traversal experience.

In a possible design, before the adding a target 3D model with a shape matching that of the target scene switching trigger to a position of the target scene switching trigger, the method further includes:
  searching a model base for a 3D model matching a trigger identifier of the target scene switching trigger as the target 3D model; or determining a shape and a size of the target scene switching trigger, and
  determining a 3D model with a highest degree of matching with the shape and the size from a model base as the target 3D model; or
  determining a plurality of historically added 3D models according to a historical model adding record of the target scene switching trigger, and determining the target 3D model from the plurality of historically added 3D models.

A suitable target 3D model may be selected in different manners. The solution has higher applicability, so that the target 3D model is selected more flexibly, and there are more alternative solutions.

According to a second aspect, a terminal device is provided, the terminal device including:
  memory, configured to store a plurality of computer programs; and
  a processor, configured to invoke the plurality of computer programs stored in the memory, to perform, according to the obtained program instruction, operations of the method according to the first aspect.

According to a third aspect, a non-transitory computer-readable storage medium is provided, storing a plurality of computer programs that, when executed by a processor of a terminal device, cause the terminal device to perform the operations of the method according to the first aspect.

It is to be understood that the above general descriptions and the following detailed descriptions are merely for exemplary and explanatory purposes, and cannot limit the present disclosure.

BRIEF DESCRIPTION OF THE DRAWINGS

To describe the technical solutions in the embodiments of this application or in the related art more clearly, the following briefly describes the accompanying drawings required for describing the embodiments or the related art. Apparently, the accompanying drawings in the following description show merely the embodiments of this application, and a person of ordinary skill in the art may still derive other drawings from these accompanying drawings without creative efforts.

DESCRIPTION OF EMBODIMENTS

Figure 1A:
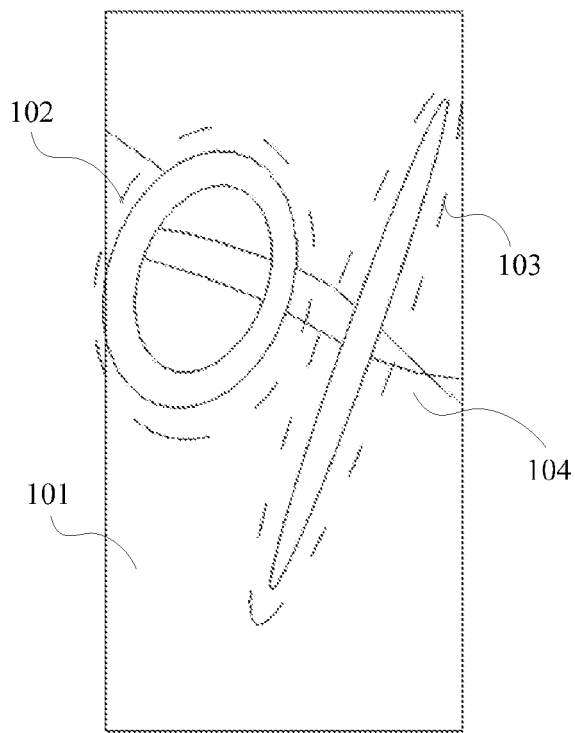
FIG. 1A is a schematic diagram of two portals in a current world according to an embodiment of this application.

In order to make objectives, technical solutions, and advantages of embodiments of this application clearer, the technical solutions in the embodiments of this application will be clearly and completely described in the following with reference to the accompanying drawings. Apparently, the embodiments to be described are only a part rather than all of the embodiments of this application. All other embodiments obtained by a person skilled in the art based on the embodiments of this application without creative efforts fall within the protection scope of the embodiments of this application. The embodiments in this application and features in the embodiments may be combined with each other in the case of no conflict. In addition, although a logical sequence is shown in the flowchart, the shown or described steps may be performed in a sequence different from the sequence herein in some cases.

In the specification, claims, and accompanying drawings of this application, the terms "first" and "second" are intended to distinguish between different objects but do not indicate a particular order. In addition, the term "include" and any other variant thereof are intended to cover a non-exclusive inclusion. For example, a process, method, system, product, or device that includes a series of steps or units is not limited to the listed steps or units, but further optionally includes a step or unit that is not listed, or further optionally includes another step or unit that is intrinsic to the process, method, product, or device.

In the embodiments of this application, "a plurality of" may represent at least two, for example, may be two, three, or more, and this is not limited in the embodiments of this application.

In addition, the term "and/or" in this specification describes only an association relationship for describing associated objects and represents that three relationships may exist. For example, A and/or B may represent the following three cases: Only A exists, both A and B exist, and only B exists. In addition, if there is no special description, the character "/" in this specification usually indicates an "or" relationship between the associated objects.

In the following, some terms in this application are described to help a person skilled in the art to understand this application.

1. Virtual scene: a virtual scene may be a pre-constructed three-dimensional scene, and an association relationship may exist between a plurality of virtual scenes. For example, the virtual scene may be a desert scene, a land scene, an ocean scene, a city scene, a forest scene, or the like. The virtual scene may be constructed according to different services, and is not specifically limited in actual application.

The virtual scene may be classified as a current virtual scene or a target virtual scene, the current virtual scene and the target virtual scene may both be virtual reality scenes, or augmented reality scenes, or mixed reality scenes. The current virtual scene is a three-dimensional space scene (three-dimensional world) in which a virtual object (for example, a game character) is currently located, and the target virtual scene is a virtual scene to which the current virtual scene is about to be switched. At one moment, there is only one current virtual scene, but there may be a plurality of target virtual scenes. For example, the current virtual scene is a desert scene, and the desert scene is associated with a land scene. In this case, the land scene may be the target virtual scene. After a switch from the desert scene to the land scene, the land scene becomes the current virtual scene. Therefore, the current virtual scene and target virtual scene are relative concepts rather than absolute concepts. A virtual scene may be the current virtual scene at one moment, and may become the target virtual scene at another moment. Similarly, a virtual scene may be the target virtual scene at one moment, and may become the current virtual scene at another moment.

In some descriptions of this specification, the virtual scene may alternatively be referred to as "virtual world" or "world". In this case, the current virtual scene may be referred to as a current world or a source world (or a current virtual world or a source virtual world), and the target virtual scene may be referred to as a target world or a destination world (or a target virtual world or a destination virtual world).

2. A scene switching trigger refers to a trigger control used for triggering a switch between different associated virtual scenes, and a switch may be performed between different virtual scenes by using the scene switching trigger. Partial information of an associated target virtual scene may be further displayed at a position corresponding to each scene switching trigger. The scene switching trigger may be a region, or the scene switching trigger may be an animation rendered on the region. In an actual application scenario, the scene switching trigger may be a virtual portal, a gate, a hole, or the like. Partial information of the target virtual scene is rendered at the position of the scene switching trigger. That is, the user may go to the next virtual scene through the scene switching trigger, and the user may see the target virtual scene through the portal according to an angle and a position of the virtual object. In other words, a switch may be performed between different virtual scenes through the scene switching trigger. Specifically, the virtual object may reach the target virtual scene from the current virtual scene after passing through the scene switching trigger. For example, the virtual object may travel between worlds after passing through the portal, that is, the virtual object may directly travel from the current world to the target world through traversing.

The scene switching trigger may be provided with different shapes. For example, the scene switching trigger may be circular or oval like a hole, or may be rectangular or near-rectangular like a door, or may be beam-shaped, or may be in another regular or irregular shape. In a specific implementation process, a scene switching trigger with a suitable shape may be selected according to a design requirement of a scene.

3. A scene switching trigger set refers to one or more sets of scene switching triggers. Each scene switching trigger in the scene switching trigger set may be associated with one target virtual scene, that is, each scene switching trigger may implement a switch from the current virtual scene to an associated target virtual scene, thereby implementing a quick switch between scenes. A user may reach an associated target world from the current world through a scene switching trigger.

Embodiments of this application include a first scene switching trigger set and a second scene switching trigger set, where the first scene switching trigger set is a set of all scene switching triggers in a current virtual scene, and the second scene switching trigger set is a set of all scene switching triggers in a target virtual scene. In either the first scene switching trigger set or the second scene switching trigger set, a plurality of scene switching triggers included in the set may be arranged in serial, or may be arranged in parallel, or may be arranged in a mixed manner including both the serial arrangement and parallel arrangement. Related descriptions of the serial arrangement, the parallel arrangement, and the mixed arrangement will be described in detail below.

4. Group: a plurality of objects may be classified into different categories according to a specific grouping rule, and each category may be referred to as a group. For example, in a game service scenario, all game roles belonging to the same tribe may be classified into the same group. In another example, in a tourist service scenario, all users going to the same scenic spot may be classified into the same group, or the like.

Figure 1B:
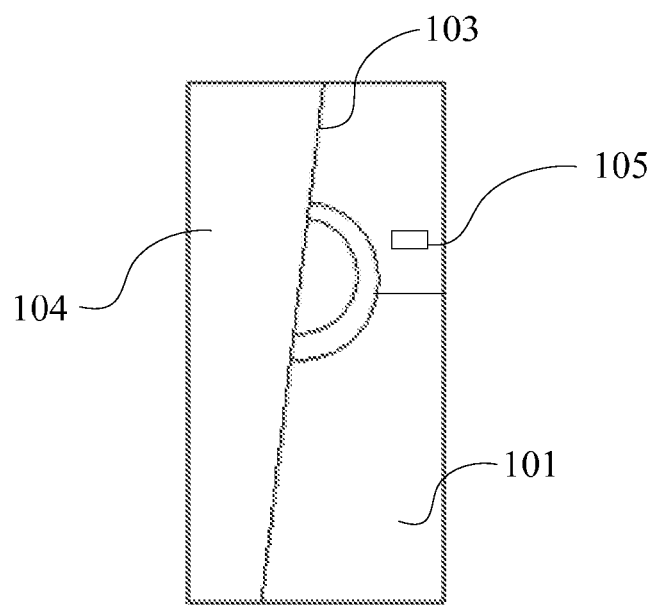
FIG. 1B is a schematic diagram of viewing outside while standing inside an extremely thin portal according to an embodiment of this application.

As mentioned above, if a portal is extremely thin, when the traveler passes through the extremely thin portal, the process is similar to a process of passing through an extremely thin plane. The passing process would be extremely short. Therefore, the traveler reaches a target world from the current world abruptly and cannot experience an immersive travel. As a result, the traveler has a poor traversal experience, causing poor service adaptability of the portal. FIG. 1A is a schematic diagram of two portals in a current world according to an embodiment of this application, and FIG. 1B is a schematic diagram of viewing outside while standing inside an extremely thin portal according to an embodiment of this application. Referring to FIG. 1A, a current world 101 includes a portal 102 and a portal 103 (for ease of understanding, the portal 102 and the portal 103 in FIG. 1A are both represented by using dotted-line circles, and similarly, similar marks for portals in subsequent drawings may also be understood in the same manner). As can be seen, a shape of the portal 102 is close to a circle, and a shape of the portal 103 is similar to beam. Description is made by using the portal 103 as an example. Viewed around the portal 103, the portal 103 is an extremely thin plane. In a process of passing through the portal 103 from the current world 101, if a traveler looks around the portal 103 from the inside of the portal 103 (that is, viewing toward the outside from the inside of the portal 103), it is found that, as shown in FIG. 1B, a target world 104 and the current world 101 that are associated with the portal 103 are approximately split by a plane. Viewed from the inside of the portal 103 towards a side edge of the portal 103, the portal 103 is similar to a line (which is actually a plane, and the portal seems to be a line because it is viewed from the side edge), and the portal 103 splits, with an extremely thin splitting thickness, the current world 101 and the target world 104 into a left part and a right part. That is, a traversal path from the current world 101 to the target world 104 is short, the traversal process is equivalent to directly passing through an extremely thin plane. In terms of a traveler, a process of traveling from the current world 101 to the target world 104 through the portal 103 is extremely short, the traveler reaches the target world 104 from the current world 101 abruptly and cannot experience an immersive "travel" as in a real world. Therefore, the traversal experience is poor. In addition, continue to refer to FIG. 1B: the current world 101 may further include another portal, such as a portal 105, at this moment; the portal 102 in FIG. 1A may not be viewed by the traveler due to the viewing angle, and therefore is not shown in FIG. 1B.

Figure 2A:
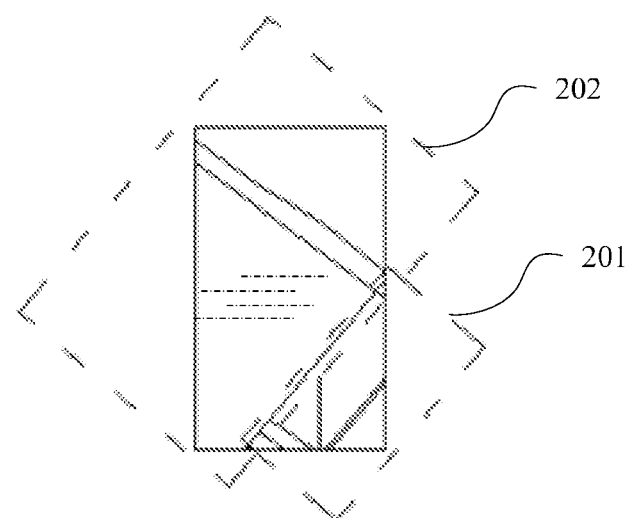
FIG. 2A is a schematic diagram of an expected effect of a service scenario according to an embodiment of this application.
Figure 2B:
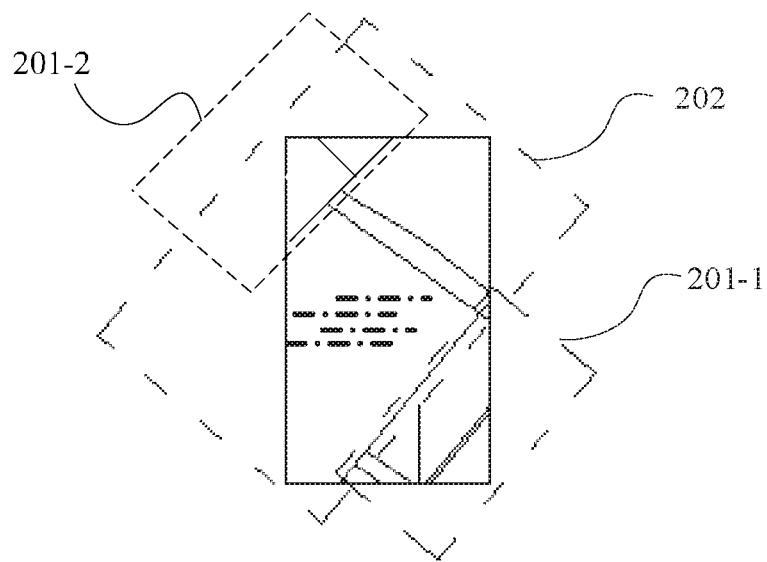
FIG. 2B is a schematic diagram of an actual effect of a service scenario according to an embodiment of this application.

FIG. 2A is a schematic diagram of an expected effect of a service scenario according to an embodiment of this application, and FIG. 2B is a schematic diagram of an actual effect of a service scenario according to an embodiment of this application. Description is made by using FIG. 2A and FIG. 2B as an example. It is assumed that in a game service scenario, during a traversal, an effect shown in FIG. 2A is to be presented according to an immersive expected traversal effect, that is, traveling from a current world 201 (for example, an office) to a target world 202 (for example, a sand beach) through the portal in an immersive manner. However, because the portal is extremely thin, an effect shown in FIG. 2B may be presented in the traversal process. That is, both a part 201-1 of the current world and a part 201-2 of the current world are presented, which causes flickering of the game picture, thus causing problems such as a goof in a game.

Therefore, to avoid the foregoing problems during a traversal, the inventor of the embodiments of this application considers adopting a specific manner to realize an objective similar to increasing the thickness of the portal in a traversal scenario. One intuitively feeling is that the extremely thin portal becomes elastic, so that in a traversal process of the traveler, a part of the portal may elastically protrude along a traversal direction, to lengthen a moving path of the traveler in the portal. In this way, in the traversal process, even if the traveler looks at both the left and the right sides of the portal, the traveler can still experience an immersive traversal due to the blocking by the thickness of the portal increased towards the traversal direction, thereby implementing a smooth transitional traversal rather than a sudden traversal in the related art and improving the traversal experience. For example, this is similar to adding a small house or some shielding decorations the outside the portal, to indirectly increase the thickness of the portal towards the traversal direction, thereby enhancing the immersive traversal experience of the traveler as much as possible, and achieving a more real traversal feeling.

Under the guidance of the foregoing design concept, the inventor further carries out technical mining and thinking in terms of image processing and image rendering, and provides a similar alternative of increasing the thickness of the portal by adding a 3D model to a corresponding position of the portal. That is, the thickness of the portal may not be really increased. Because the portal is determined in a manner of image rendering and the thickness thereof is also fixed, and in most cases, the portal needs to be presented in an extremely thin form, the inventor implicitly increases the thickness of the portal by adding a 3D model, to express the foregoing design concept in terms of technical feasibility. In this way, the traveler may implement a smooth and immersive traversal, and a switch between scenes may be realized based on the traversal experience with a relatively strong immersive feeling.

The technical solution in the embodiments of this application may be applied to a plurality of augmented reality or virtual reality or mixed reality services and scenes. For example, the technical solution may be applied to a game service, so that a game player may travel between different scenes to complete a game task; or the technical solution may be applied to a military training service, so that a user may travel between a plurality of different scenes (for example, a land scene, an ocean scene, a city scene, and a jungle scene), to complete different combat missions; or the technical solution may be applied to a tourist service, so that the user may select a plurality of different cities or scenic spots to travel through, to have a sense of being immersed in the virtual world, and the user may enjoy beautiful sceneries without going out. The service and scene to which the technical solution in the embodiments of this application may be applied is not specifically limited in the embodiments of this application, and the technical solution may be implemented correspondingly according to a specific service and scene.

To further describe the technical solution provided in the embodiments of this application, the technical solution is described in detail below with reference to the accompanying drawings and specific embodiments. Although the embodiments of this application provide method operational steps shown in the following embodiments or accompany drawings, more or fewer operational steps may be included in the methods based on conventional efforts or without creative efforts. In the steps in which no necessary causal relationship logically exists, the execution order of the steps is not limited to the execution orders provided in the embodiments of this application. When the method is in an actual processing process or executed by an apparatus, sequential execution or parallel execution may be performed according to the method shown in the embodiment or the accompanying drawing (for example, in a parallel processor or a multi-thread processing environment).

Figure 3:
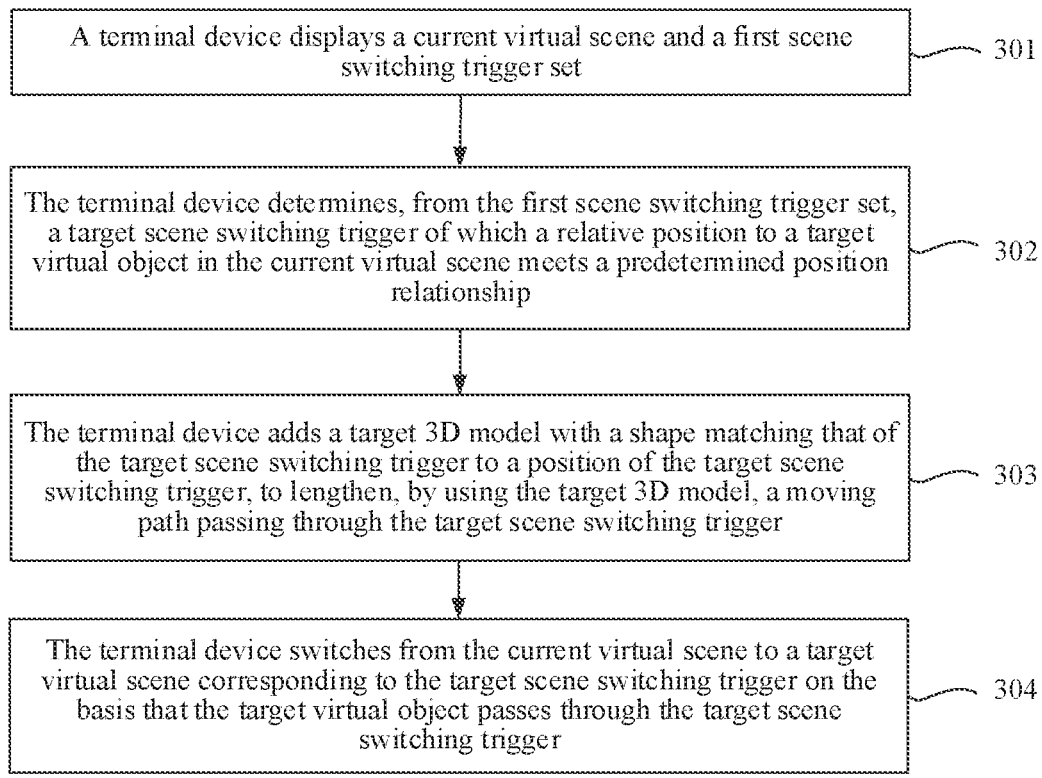
FIG. 3 is a flowchart of a virtual scene switching method according to an embodiment of this application.

FIG. 3 is a flowchart of a virtual scene switching method according to an embodiment of this application, and the technical solution in the embodiments of this application is described below with reference to FIG. 3. A process of the virtual scene switching method in this embodiment of this application is described as follows:

Step 301: A terminal device displays a current virtual scene and a first scene switching trigger set.

The scene switching trigger is used for triggering a switch between different associated virtual scenes, and the first scene switching trigger set is a set of scene switching triggers triggering a switch from the current virtual scene to at least one associated virtual scene.

Figure 4A:
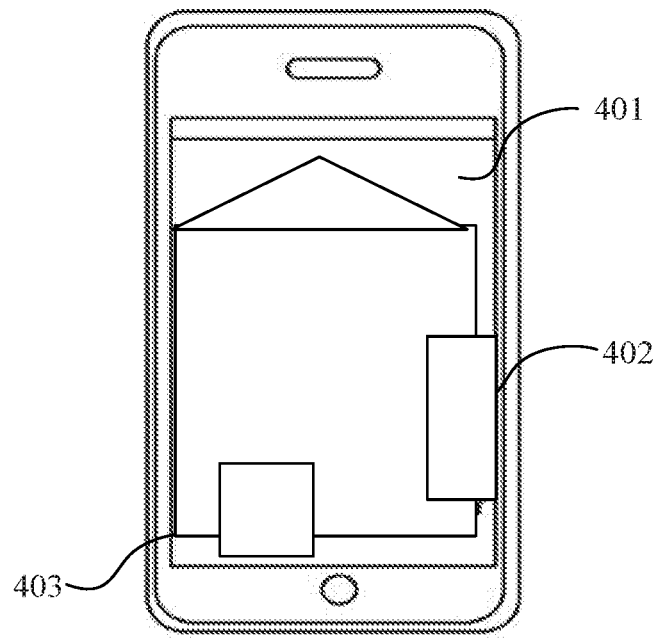
FIG. 4A is a schematic diagram of two scene switching triggers in a current virtual scene according to an embodiment of this application.

Referring to FIG. 4A, FIG. 4A is a schematic diagram of two scene switching triggers in a current virtual scene according to an embodiment of this application. A current virtual scene 401 (that is, a house image in FIG. 4A) is displayed on a screen of a terminal device (for example, a mobile phone), and two scene switching triggers, namely, a scene switching trigger 402 and a scene switching trigger 403 (for an intuitive understanding, two rectangular boxes in FIG. 4A), are further displayed in the current virtual scene 401. This scene switching trigger 402 and the scene switching trigger 403 herein may be understood as the first scene switching trigger set in this embodiment of this application. Both the scene switching trigger 402 and the scene switching trigger 403 may trigger a switch from the current virtual scene 401 to an associated virtual scene. For example, a virtual object in the current virtual scene 401 may directly pass through the scene switching trigger 403 to enter another virtual scene, and for ease of description, the associated virtual scene to which the current virtual scene 401 is switched is referred to as a target virtual scene in this embodiment of this application.

Figure 4B:
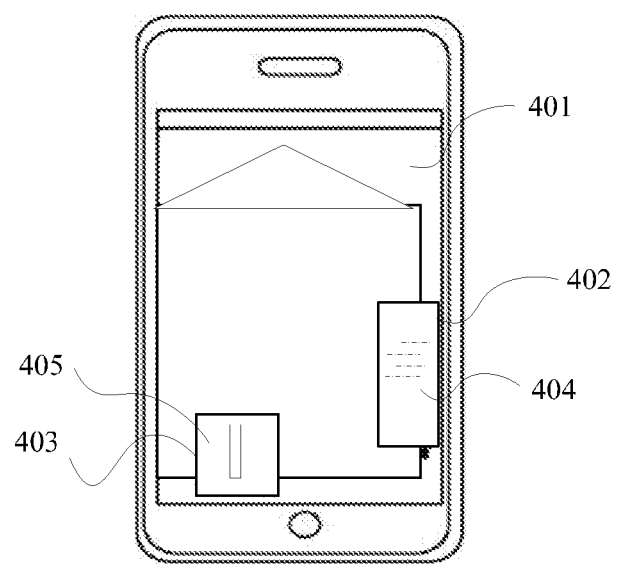
FIG. 4B is another schematic diagram of two scene switching triggers in a current virtual scene according to an embodiment of this application.

In a specific implementation process, partial information of the target virtual scene associated with the scene switching trigger may be further displayed at a position corresponding to the scene switching trigger. For example, as shown in FIG. 4B, partial information of a target virtual scene 404 is displayed at a position corresponding to the scene switching trigger 402, and partial information of a target virtual scene 405 is displayed at a position corresponding to the scene switching trigger 403. It can be seen that the target virtual scene 404 is a desert scene, and the target virtual scene 405 is a forest scene. In a possible application, the virtual object in the current virtual scene 401 may directly pass through the scene switching trigger 402 to reach the target virtual scene 404, and in another possible application, the virtual object may directly pass through the scene switching trigger 403 to reach the target virtual scene 405, to realize a switch between scenes by passing through the portal.

In this embodiment of this application, the scene switching trigger may be used for displaying partial information of the target virtual scene, and based on this function, the scene switching trigger may further have different display forms. It may be understood that, in an application scenario, a user may see the target virtual scene through the scene switching trigger, which is similar to a case that the scene switching trigger encircles partial information of the target virtual scene. The display form of the scene switching trigger is intuitively introduced below from the perspective of a user. The display form of the scene switching trigger includes: 1. scene switching triggers in a parallel arrangement; 2. scene switching triggers in a serial arrangement; 3. scene switching triggers in a mixed arrangement, where the mixed arrangement includes scene switching triggers in a serial arrangement and scene switching triggers in a parallel arrangement.

1. Scene Switching Triggers in a Parallel Arrangement

Figure 5A:
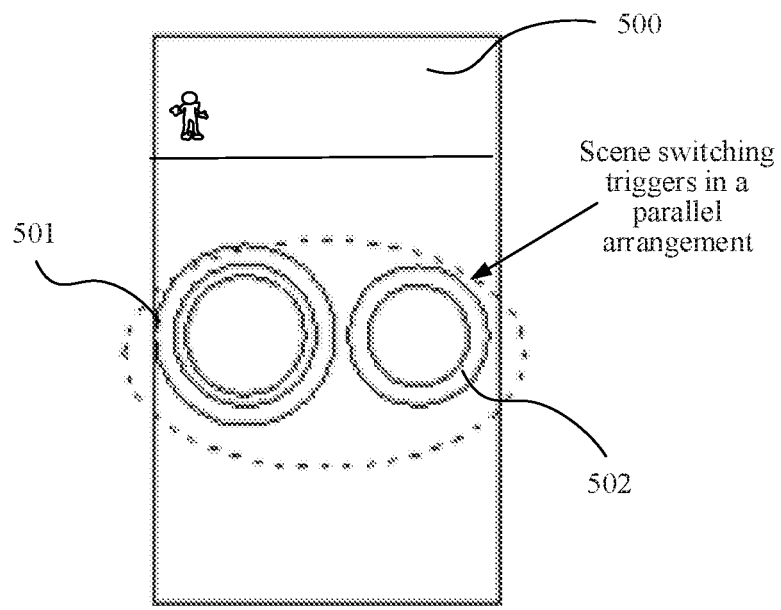
FIG. 5A is a schematic diagram of scene switching triggers in a parallel arrangement according to an embodiment of this application.

FIG. 5A is a schematic diagram of scene switching triggers in a parallel arrangement according to an embodiment of this application. In an application scenario, as shown in FIG. 5A, it can be seen that a current virtual scene 500 includes a scene switching trigger 501 and a scene switching trigger 502, a target virtual scene corresponding to the scene switching trigger 501 is a forest scene, and a target virtual scene corresponding to the scene switching trigger 502 is an ocean scene. Certainly, more scene switching triggers may be displayed, and in FIG. 5A, description is made by using an example in which only two scene switching triggers are displayed. In FIG. 5A, the user may see the forest scene through the scene switching trigger 501 and see the ocean scene through the scene switching trigger 502. In this case, an arrangement manner of the scene switching trigger 501 and the scene switching trigger 502 may be understood as a parallel arrangement of scene switching triggers, that is, the two scene switching triggers are displayed in the current virtual scene 500 in the same layer.

2. Scene Switching Triggers in a Serial Arrangement

Figure 5B:
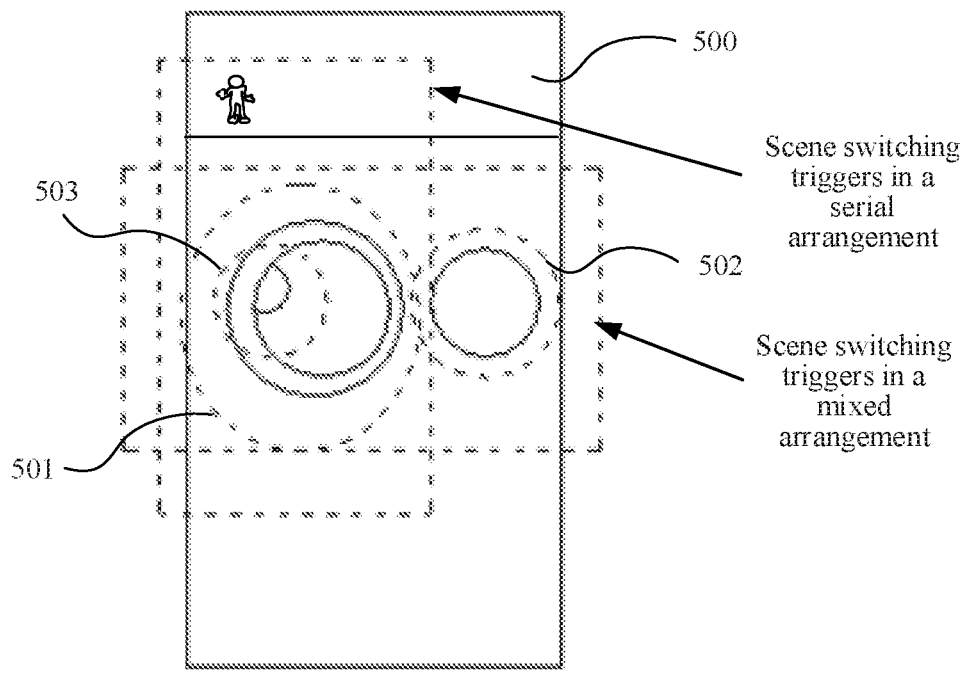
FIG. 5B is a schematic diagram of scene switching triggers in a serial arrangement and in a mixed arrangement according to an embodiment of this application.

FIG. 5B is a schematic diagram of scene switching triggers in a serial arrangement and in a mixed arrangement according to an embodiment of this application. Continue to refer to FIG. 5B: compared with FIG. 5A, a scene switching trigger 503 is added in FIG. 5B. The user may see the forest scene and the scene switching trigger 503 through the scene switching trigger 501, and further see partial information of another target virtual scene through the scene switching trigger 503. In this case, an arrangement manner of the scene switching trigger 501 and the scene switching trigger 503 may be understood as a serial arrangement of scene switching triggers.

3. Scene Switching Triggers in a Mixed Arrangement

Continue to refer to FIG. 5B: FIG. 5B not only includes scene switching triggers in a parallel arrangement (that is, the scene switching trigger 501 and the scene switching trigger 502), but also includes scene switching triggers in a serial arrangement (that is, the scene switching trigger 501 and the scene switching trigger 503). Therefore, an overall arrangement manner of the three scene switching triggers in FIG. 5B may be understood as a mixed arrangement of scene switching triggers. That is, scene switching triggers in a mixed arrangement at least include three scene switching triggers.

In actual application, the foregoing scene switching triggers in a serial arrangement, the scene switching triggers in a parallel arrangement, and the scene switching triggers in a mixed arrangement may be arbitrarily combined in the current virtual scene. FIG. 5A to FIG. 5B herein are only exemplary descriptions, and do not constitute a limitation to the embodiments of this application.

Both the current virtual scene and the target virtual scene are three-dimensional scenes pre-constructed according to a service. Each three-dimensional scene includes a background and all virtual materials in the three-dimensional scene, and different three-dimensional scenes may be constructed according to different services. For example, in a tourist service, a plurality of three-dimensional scenes may be different tourist attractions, such as the Palace Museum, the Temple of Heaven, and the like, or may be indoor scenes or outdoor scenes, and specifically, the three-dimensional scenes are constructed according to an actual situation. Alternatively, in an adventure game scene, the plurality of three-dimensional scenes may be a forest scene, a desert scene, a sand beach scene, a city scene, and the like. In this embodiment of this application, the plurality of three-dimensional scenes are pre-constructed according to a specific service.

Figure 6:
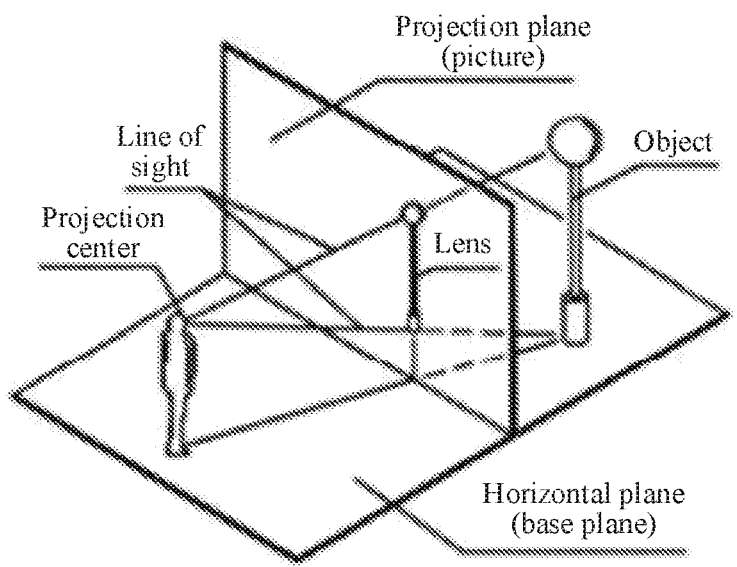
FIG. 6 is a schematic diagram of dimensionality reduction of a three-dimensional scene according to an embodiment of this application.

Referring to FIG. 6, FIG. 6 is a schematic diagram of dimensionality reduction of a three-dimensional scene according to an embodiment of this application. In a three-dimensional coordinate system, each point on an object may be described by using three components (x, y, z). A three-dimensional object is projected. Projection means to convert a three-dimensional object into a two-dimensional object through mapping. In FIG. 6, a projection line (or line of sight) is projected from a point in space (for example, the point is referred to as a viewpoint or a projection center), and a projection place is placed between the three-dimensional object and the projection center. The three-dimensional object is perspectively projected onto the projection plane to obtain a two-dimensional image on the projection plane, that is, dimensionality reduction is performed on the three-dimensional image to obtain a two-dimensional planar image. Each three-dimensional scene corresponds to one two-dimensional planar scene, and each two-dimensional planar scene corresponds to a plurality of two-dimensional planar images.

Figure 7:
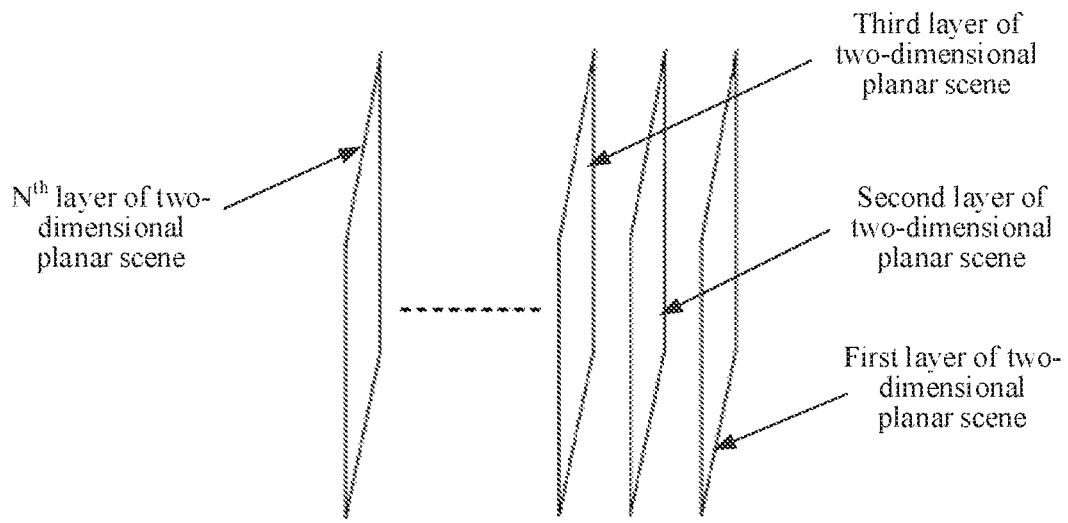
FIG. 7 is a schematic diagram of two-dimensional planar scenes obtained after dimensionality reduction is performed on three-dimensional scenes in a virtual scene set according to an embodiment of this application.

Further, the two-dimensional planar scenes respectively corresponding to all of the three-dimensional scenes may be overlaid, so that different virtual scenes may be associated through a scene switching trigger. FIG. 7 is a schematic diagram of two-dimensional planar scenes obtained after dimensionality reduction is performed on three-dimensional scenes in a virtual scene set according to an embodiment of this application. Referring to FIG. 7, FIG. 7 shows two-dimensional planar scenes obtained after dimensionality reduction is performed on three-dimensional scenes in a plurality of virtual scenes (which is referred to as a virtual scene set). The virtual scene set includes a plurality of overlaid two-dimensional planar scenes. It is assumed that there are N layers of two-dimensional planar scenes, N being an integer greater than or equal to 2. Each of the plurality of two-dimensional planar scenes is one layer in the virtual scene set. The plurality of layers of the two-dimensional planar scenes are overlaid to complete superposition of a plurality of scenes. In this embodiment of this application, dimensionality reduction performed on the three-dimensional scene is an intermediate process of rendering the virtual scene, so as to overlay the plurality of three-dimensional scenes and associate the plurality of virtual scenes through the scene switching triggers. During dimensionality reduction, a plurality of scenes may be overlaid in sequence, and a scene switching trigger is disposed in each scene. A region corresponding to the scene switching trigger made of a transparent material, so that partial information of a next scene can be displayed through the scene switching trigger.

There is a mapping relationship between a real-time angle of a camera and a viewing angle of the virtual object (for example, a virtual character) in the virtual scene. The terminal device may calculate the viewing angle of the virtual object in the virtual scene according to the real-time angle of the camera, and determines position information of the terminal device through a sensor. The terminal device maps, according to the position information of the terminal device and a position of the virtual object in the virtual scene, the real-time angle of the camera and the position information of the terminal device to the viewing angle and the position of the virtual object in the virtual scene, and determines the viewing angle and the position of the virtual object in the virtual scene according to the real-time angle of the camera and the position information. The virtual object (for example, the virtual object may be a virtual character) may be displayed; alternatively, the virtual object may not be displayed, that is, a user may alternatively not see the virtual object in the virtual scene.

Figure 8:
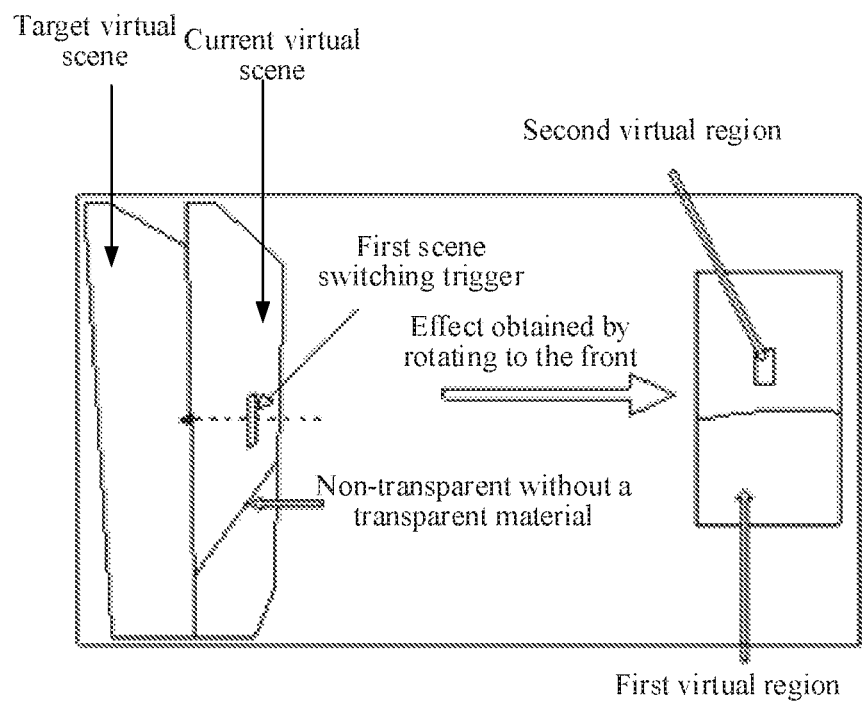
FIG. 8 is a schematic perspective view of two layers of virtual scenes according to an embodiment of this application.
Figure 9:
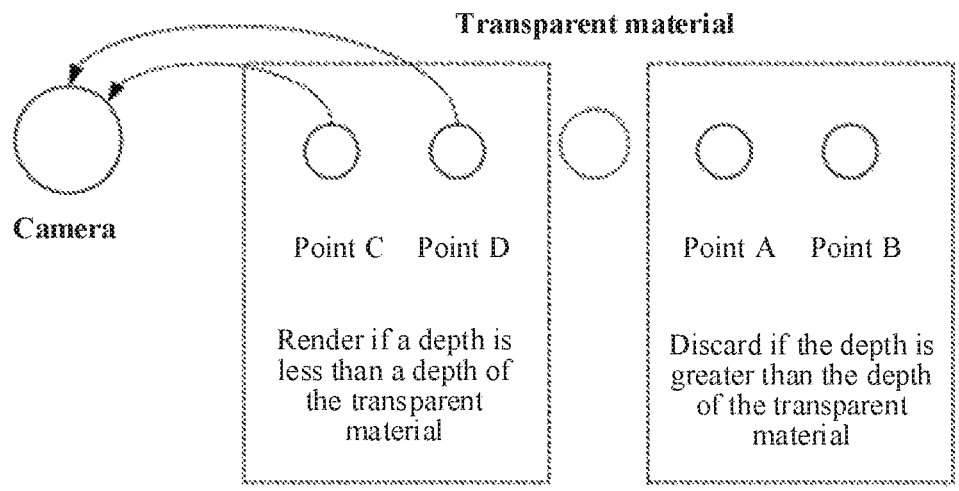
FIG. 9 is a schematic diagram of a perspective principle of a scene switching trigger according to an embodiment of this application.

FIG. 8 is a schematic perspective view of two layers of virtual scenes according to an embodiment of this application. Referring to FIG. 8, FIG. 8 is a perspective view of two layers of virtual scenes (worlds), a first scene switching trigger (portal) is made of a transparent material, and the transparent material is understood as follows: the first scene switching trigger is not rendered, and a next virtual scene is rendered. Specifically. FIG. 9 is a schematic diagram of a perspective principle of a scene switching trigger according to an embodiment of this application. Referring to FIG. 9, the transparent material is not rendered, all points (that is, a background of the scene switching trigger, such as a point A and a point B in FIG. 9) deeper than the transparent material are not rendered, and normal depth rendering is performed on all points (that is, foreground points of the scene switching trigger, such as a point C and a point D in FIG. 9) shallower than the transparent material. In this way, a visual illusion is created. After line of sight penetrates the first portal, all objects (including the background) behind the portal are not rendered, and a next virtual scene is rendered, so that the line of sight directly passes through the current scene to reach the next virtual scene.

Figure 10:
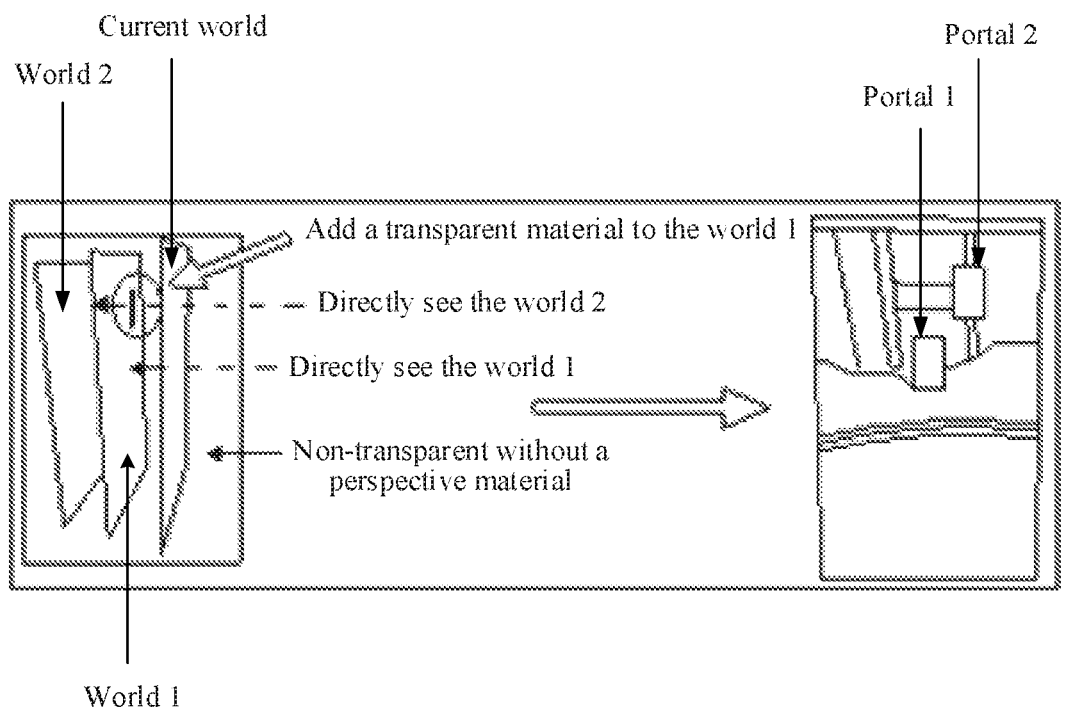
FIG. 10 is a schematic diagram of a perspective principle of three layers of virtual scenes according to an embodiment of this application.

FIG. 10 is a schematic diagram of a perspective principle of three virtual scenes according to an embodiment of this application. Referring to FIG. 10 again, FIG. 10 is a schematic diagram of a perspective principle of three virtual scenes (worlds). A transparent material is added to a current virtual scene (a current world), and a transparent material is also added to a position corresponding to the current world in a first target virtual scene (that is, a world 1). It may be understood that partial information of a world 2 is rendered at a position of a first scene switching trigger (a portal 2), so that a user can directly see a second target virtual world (that is, the world 2) through the portal 2. Partial information of the world 2 is rendered at a position of a first scene switching trigger (a portal 1) corresponding to the current virtual scene, so that the user can directly see the first target virtual scene (that is, the world 1) through the portal 1. The current virtual scene is associated with the world 2 through the portal 1. In this example, the scene switching triggers are arranged in parallel, and a target virtual scene associated with the current virtual scene may be seen through the first scene switching trigger. If a second scene switching trigger is disposed at the transparent material position of the world 1, and the partial information of the second target virtual scene (that is, the world 2) is rendered at a position of the second scene conversion trigger, the user may see the partial information of the world 1 through the portal 1 in the current world and see the portal in the world 1, and may see the partial information of the world 2 through the portal in the world 1.

Step 302: The terminal device determines, from the first scene switching trigger set, a target scene switching trigger of which a relative position to a target virtual object in the current virtual scene meets a predetermined position relationship.

One or more virtual objects, such as a plurality of roles in a game, may be displayed in the current virtual scene. When a virtual object intends to reach another virtual scene from the current virtual scene, a scene switch is implemented through a corresponding scene switching trigger. Specifically, the virtual object reaches a corresponding target virtual object by passing through a scene switching trigger (portal). For ease of description, the virtual object that intends to travel between scenes is referred to as a target virtual object in this embodiment of this application.

Figure 11:
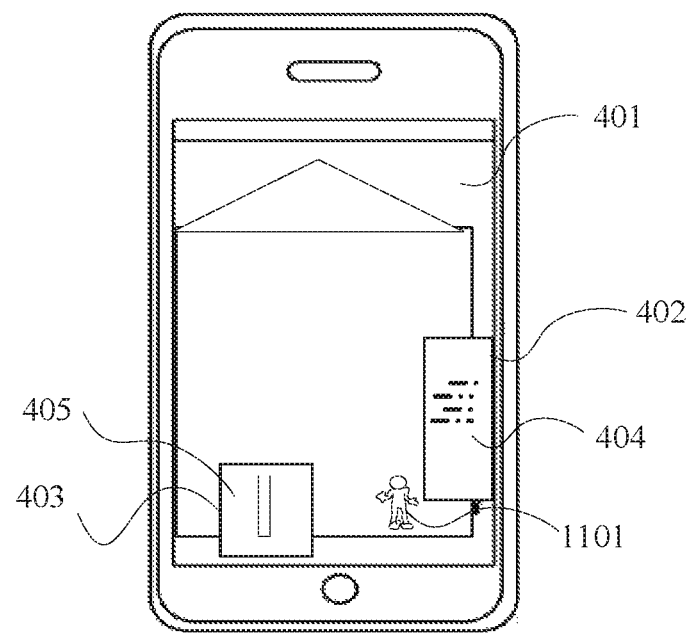
FIG. 11 is a schematic diagram in which a target virtual object is about to pass through a scene switching trigger according to an embodiment of this application.

Referring to FIG. 11 in combination with the example in FIG. 4B, FIG. 11 is a schematic diagram in which a target virtual object is about to pass through a scene switching trigger according to an embodiment of this application. When the terminal device detects that the target virtual object 1101 in the current virtual scene 401 gradually approaches the scene switching trigger 402, it indicates that the target virtual object 1101 intends to pass through the scene switching trigger 402 to reach the target virtual scene 404. Similarly, when the terminal device detects that the target virtual object 1101 gradually approaches the scene switching trigger 403, it indicates that the target virtual object 1101 intends to pass through the scene switching trigger 403 to reach the target virtual scene 405. Certainly, the current virtual scene 401 may further include another virtual object. In FIG. 11, to simplify the description, the target virtual object 1101 is merely used as an example for illustration. That is, the terminal device may detect a moving track of each virtual object in the current virtual scene 401, to further detect a relative position between each virtual object and each scene switching trigger. For ease of description, a scene switching trigger through which the target virtual object intends to pass is referred to as a target scene switching trigger in this embodiment of this application, for example, the target virtual scene 404 and the target virtual scene 405 in the foregoing example.

When the virtual object intends to pass through the scene switching trigger, the virtual object generally gradually approaches the scene switching trigger. Therefore, in this embodiment of this application, whether the target virtual object needs to pass through the scene switching trigger may be determined by detecting whether a relative position between the scene switching trigger and the target virtual object meets a predetermined position relationship. For example, when it is detected a distance between the scene switching trigger and the target virtual object is less than or equal to a predetermined distance, it may indicate that the target virtual object needs to pass through the scene switching trigger. For ease of description, in this embodiment of this application, the scene switching trigger of which a relative position to the target virtual object meets the predetermined position relationship is referred to as a target scene switching trigger.

There is a mapping relationship between a position of the terminal device in a real scene and a position of the target virtual object in the virtual scene. Therefore, a real-time position of the target virtual object in the current virtual scene may be calculated by detecting a movement of the position of the terminal device, and the position of the target virtual object obtained through calculation is further compared with a position of each scene switching trigger, to determine whether a relative position between the target virtual object and each scene switching trigger meets the predetermined position relationship, to determine the target scene switching trigger through which the target virtual object intends to pass in the first scene switching trigger set. Still using FIG. 1 as an example, if it is assumed that a relative position between the target virtual object 1101 and the scene switching trigger 402 meets the predetermined position relationship at this moment, the scene switching trigger 402 may be determined as the target scene switching trigger.

Step 303: The terminal device adds a target 3D model with a shape matching that of the target scene switching trigger to a position of the target scene switching trigger, to lengthen, by using the target 3D model, a moving path passing through the target scene switching trigger.

If it is determined that a relative position between the target virtual object and a scene switching trigger (that is, the target scene switching trigger) meets the predetermined position relationship, it indicates that the target virtual object really intends to pass through the target scene switching trigger to reach the corresponding target virtual scene. According to the foregoing description, to alleviate or even eliminate an abrupt feeling while the target virtual object passes through an extremely thin scene switching trigger so that the target virtual object can experience an immersive traversal, in this embodiment of this application, a moving path of the target virtual object passing through the target scene switching trigger may be lengthened in a manner similar to thickening the target scene switching trigger. Specifically, a 3D model with a shape matching that of the target scene switching trigger is added to a position of the target scene switching trigger, and for ease of description, the 3D model added to the position of the target scene switching trigger is referred to as a target 3D model in this embodiment of this application. For example, if the target scene switching trigger is rectangular, the target 3D model may also be rectangular or may be near-rectangular; if the target scene switching trigger is circular, the target 3D model is circular or near-circular. In another possible implementation, for example, if the target scene switching trigger is circular, the target 3D model may alternatively be rectangular, but it is required that a size of the target 3D model is greater than a size of the target scene switching trigger, so that the target 3D model can be placed on the periphery of the target scene switching trigger in an encircling manner, which is similar to adding a shielding small house or another shelter to the target scene switching trigger by using the target 3D model, to implicitly increase the thickness of the target scene switching trigger, thereby improving the traversal experience of the traveler (that is, the target virtual object).

By adding a target 3D model with a shape matching that of the target scene switching trigger to a position of the target scene switching trigger, the moving path passing through the target scene switching trigger may be lengthened by using the added target 3D model. From the perspective of the traveler, the thickness of the target scene switching trigger towards a traversal direction may be implicitly increased by using the added target 3D model, to indirectly increase the moving path during a traversal, so that in the traversal process, even if the traveler looks at two sides of an extremely thin portal, the traversal process may be implicitly prolonged due to the blocking by the thickness of the portal increased towards the traversal direction. By indirectly increasing the thickness of the portal towards the traversal direction, the traveler feels like passing through a door during a traversal, thereby achieving an immersive traversal and enhancing the traversal experience of the user.

Generally, because the 3D model has a volume, the 3D model has a specific thickness. Therefore, in this embodiment of this application, the thickness of the target scene switching trigger may be as equivalent as possible by adding the 3D model. In addition, to achieve a better effect, namely, to eliminate the abrupt feeling during a traversal as much as possible by using the added 3D model to improve a real traversal experience of a user, in an optional manner, during selection of a matching target 3D model, a 3D model of which a thickness in a moving direction of the target virtual object is greater than or equal to a predetermined thickness may be selected, where the predetermined thickness may be obtained according to a principle related to image rendering and hardware features of the terminal device.

Specifically, in a computer three-dimensional image, projection may be regarded as a method of converting three-dimensional coordinates into two-dimensional coordinates. Orthographic projection and perspective projection are usually used. The orthographic projection is often used for three-dimensional modeling. The perspective projection is similar to a human vision system, and therefore is often used for presentation of a three-dimensional world in a two-dimensional plane. The perspective projection is a method for drawing or rendering on a two-dimensional paper or a canvas plane to obtain a visual effect that is similar to a real three-dimensional object, which is also referred to as a perspective view. The perspective projection has a series of perspective features such as a sense of disappearing, a sense of distance, and regular variations presented by bodies with the same size, which can authentically reflect a space image of a body. The perspective projection is generally applied to animation, visual simulation, and many other aspects that reflect reality.

Figure 12:
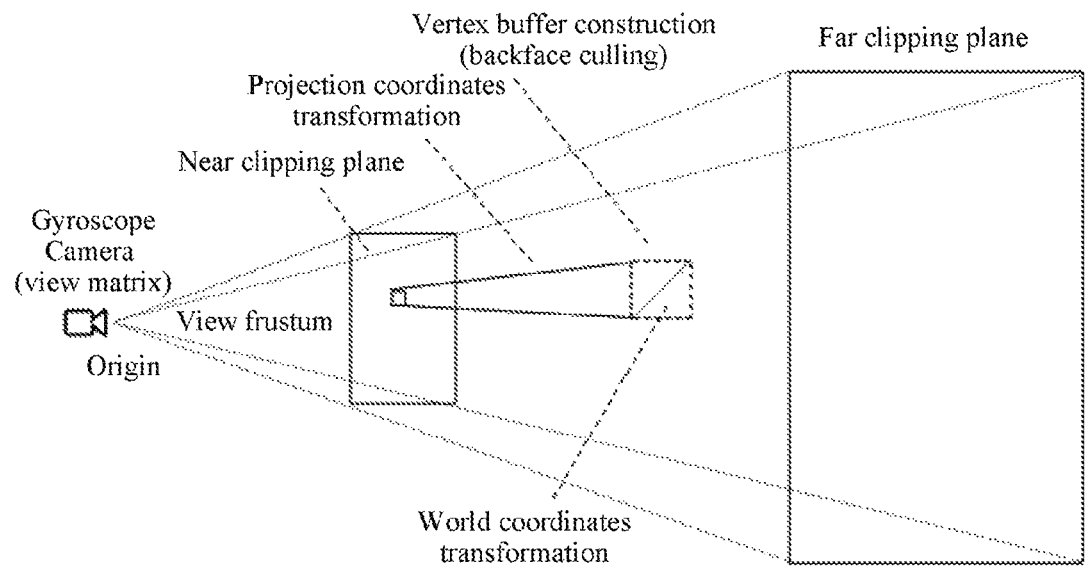
FIG. 12 is a schematic diagram of a principle of perspective projection according to an embodiment of this application.

The virtual object has a specific volume. Therefore, during a traversal through a portal, not one point of the virtual object passes through the portal, but a plane with a thickness passes through the portal. FIG. 12 is a schematic diagram of a principle of the perspective projection, where the camera may be understood as a camera in the terminal device (for example, a mobile phone), and a viewing angle range and a real-time position of the target virtual object may be calculated according to a position of the camera. To ensure that in a process of passing through the portal, the target virtual object only sees a picture of one world and passes through the portal in an immersive manner, the thickness of the 3D model is required to completely enclose the viewing angle range (that is, a pyramidal space from an origin to a near clipping plane in FIG. 12) of the target virtual object. Therefore, the minimum thickness, namely, the foregoing predetermined thickness of the added 3D model may be calculated according to this principle. That is, in this embodiment of this application, the predetermined thickness may be obtained through calculation according to the viewing angle range of the target virtual object in the current virtual scene and a distance between the camera and the near clipping plane. In other words, the thickness of the selected target 3D model may be at least greater than or equal to the predetermined thickness. In this way, the abrupt traversal feeling during the traversal process may be minimized, to enhance the traversal experience of the traveler as much as possible, thereby implementing an immersive service experience.

In this embodiment of this application, the target 3D model may be selected by using any one of the following selection manners.

Manner 1: Search a model base for a 3D model matching a trigger identifier of the target scene switching trigger as the target 3D model. One corresponding identifier may be set for each scene switching trigger, and the corresponding scene switching trigger may be determined according to the identifier. In this way, a system naturally knows related features such as a shape and a size of each scene switching trigger, to directly select a matching 3D model by matching with the trigger identifier. Still using FIG. 11 as an example, it is assumed that a trigger identifier corresponding to the scene switching trigger 402 is xcm-1 and a trigger identifier corresponding to the scene switching trigger 403 is uoi-3, when the target virtual object 1101 needs to pass through the scene switching trigger 402, a 3D model matching the trigger identifier xcm-1 may be searched for a model base and selected as the eventually added target 3D model. In a specific implementation process, a matching 3D model specifically used for increasing the thickness may be preset for each scene switching trigger. The matching mentioned herein may include shape matching, size matching, thickness matching, and even matching of effects such as a color and a special effect.

Manner 2: First determine a shape and a size of the target scene switching trigger, and then determine, from a model base, a 3D model with a highest degree of matching with the shape and the size as the target 3D model. In the manner 2 is to select, a 3D model with a highest matching degree is selected in a fuzzy matching manner as the eventually used target 3D model.

Manner 3: First determine a plurality of historically added 3D models according to a historical model adding record of the target scene switching trigger, and then select one of the plurality of historically added 3D models as the target 3D model. In this embodiment, the 3D model matching each scene switching trigger may be recorded each time, and a function of the 3D model added each time may be known according to the record, so that a plurality of 3D models used for implicitly increasing the thickness of the scene switching trigger may be selected, and then one 3D model, for example, one that is used most frequently or is recently used, is further selected from the plurality of 3D models as the eventually used target 3D model. Operations may be simplified in a manner of adding by using a historical usage record, and a matching degree is relatively high.

In addition, after the target 3D model is selected according to the foregoing introduced manner, before the target 3D model is officially used (that is, added to the position of the target scene switching trigger), a group to which the target virtual object belongs may be further determined, and then a group identifier special effect corresponding to the group is added to the selected target 3D model, to further obtain a target 3D model added with the group identifier special effect. Eventually, the target 3D model added with the group identifier special effect is placed at the position corresponding to the target scene switching trigger. In this embodiment of this application, a cool effect may be added visually by adding a group identifier special effect, so that the group to which the target virtual object belongs may be identified according to a special effect of the portal during a traversal. In this way, the virtual object is more identifiable and the service experience is better.

Besides, when the target 3D model is to be added, a display position of the target 3D model relative to the target scene switching trigger may be determined according to a result of comparison between a size of the target 3D model and a size of the target scene switching trigger, and then the target 3D model is displayed according to the determined display position. For example, if the size of the target 3D model is greater than the size of the target scene switching trigger, the target 3D model may be added on the periphery of the target scene switching trigger, which is similar to enclosing the target scene switching trigger by using the target 3D model. When the size of the target scene switching trigger is greater than the size of the target 3D model, the target 3D model may be, for example, added and displayed at an inner side the target scene switching trigger. By determining the display position of the target 3D model by comparing sizes, the display position of the target 3D model may fit the target scene switching trigger as much as possible, to ensure adding and usage effects of the target 3D model.

In this embodiment of this application, the added target 3D model may have a transparent effect. For example, it may be interpreted as follows: the target 3D model is made of a transparent material. From the perspective of image rendering, the material manufacturing the target 3D model may be rendered according to the manner described in FIG. 9. That is, the material (for example, the material is referred to as a manufacture material) manufacturing the target 3D model is not rendered, all points (that is, the background points of the manufacture material) deeper than the manufacture material are not rendered, and normal depth rendering is performed on all points (that is, foreground points of the manufacture material) shallower than the manufacture material. In this way, a visual illusion may be created, so that the line of sight may directly penetrate the manufacture material and reach an outer range, thereby achieving a perspective effect. Therefore, the traveler can directly see a picture outside the target 3D model through the target 3D model.

In the traversal process, the traveler can see a picture of a target world (that is, the target virtual scene) through the target 3D model having a perspective effect. In this way, the traversal process is less dull, and becomes more interesting. In addition, the traveler can also see the picture of the target world in the traversal process, the mobile dynamic traversal further enhances the immersive traversal feeling of the traveler, so that the traveler feels as if traveling in a real world.

Step 304: The terminal device switches from the current virtual scene to a target virtual scene corresponding to the target scene switching trigger on the basis that the target virtual object passes through the target scene switching trigger.

After the target 3D model is added to the position of the target scene switching trigger, the target virtual object may pass through the target scene switching trigger. Because the target 3D model is used for increasing the thickness of the target scene switching trigger, and moreover, a model decoration may be added to the appearance of the target scene switching trigger. After the target virtual object passes through the target scene switching trigger, the terminal device may switch the scenes, that is, switch from the current virtual scene to the target virtual scene corresponding to the target scene switching trigger. Specifically, the terminal device may render the target virtual scene and the second scene switching trigger set in the target virtual scene. The terminal device switches from the current virtual scene to the target virtual scene when the target virtual object completes the traversal, to implement the switch between scenes. The second scene switching trigger set is a set of scene switching triggers triggering a switch from the target virtual scene to one or more associated virtual scenes.

Figure 13:
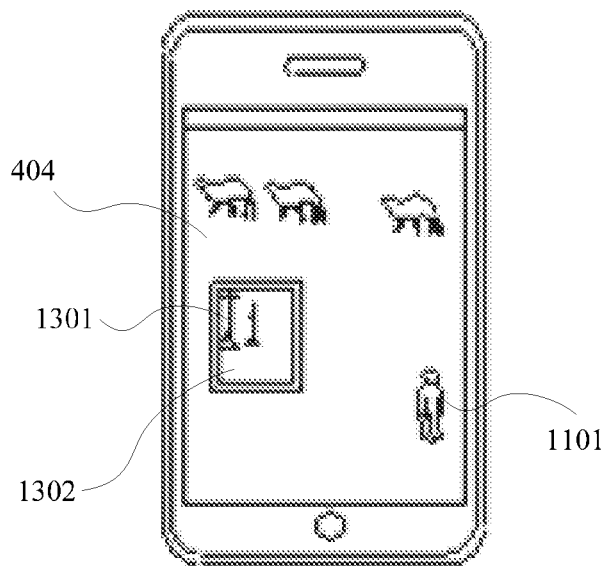
FIG. 13 is a schematic diagram of switching from a current virtual scene to a target virtual scene according to an embodiment of this application.

After the scene is switched from the current virtual scene to the target virtual scene, the target virtual scene is displayed on the terminal device, and the target virtual object and the second scene switching trigger set are displayed in the target virtual scene. Referring to the example of FIG. 11 in combination with FIG. 13, FIG. 13 is a schematic diagram of switching from a current virtual scene to a target virtual scene according to an embodiment of this application. FIG. 13 is a schematic diagram that the target virtual object 1101 reaches the target virtual scene 404 (that is, a desert scene) after completing the traversal. The target virtual scene 404 further includes a scene switching trigger 1301, and partial information of another target virtual scene 1302 displayed corresponding to the scene switching trigger 1301. Because there is only one scene switching trigger 1301 in this case, the scene switching trigger 1301 is the foregoing second scene switching trigger set, that is, the second scene switching trigger set only includes one scene switching trigger in this case.

In addition, after completing the traversal, to restore the extremely thin state of the portal, the previously added target 3D model may be deleted at this time, or the previously added target 3D model may be hidden, so that the 3D model can be directly displayed when required subsequently.

For ease of understanding, a traversal process in this embodiment of this application is illustrated below with reference to FIG. 14. Referring to a schematic diagram of a travel between two worlds (that is, a world 1 and a world 2) shown in FIG. 14. As shown in FIG. 8, a target virtual object travels from a current virtual scene (that is, the world 1) to a target virtual scene (that is, the world 2) through a first scene switching trigger (that is, a portal), the target virtual object (which is represented by using an eye image in FIG. 14) performs a process along a direction indicated by an arrow starting from the image shown at the upper left corner of FIG. 14, to implement a travel from the world 1 to the world 2. For ease of description, a specific traversal process is described by using images A, B, C, and D in FIG. 14 according to a traversal process. First, in the image A of FIG. 14, the target virtual object is located in the world 1 at this moment, and the target virtual object can see the world 2 through a portal. In the image B of FIG. 14, the target virtual object is already close to the portal, and in this case, it may be considered that a relative position between the target virtual object and the portal meets a predetermined position relationship, and a 3D model similar to a door may be added on the periphery of the portal. The added 3D model (that is, the target 3D model introduced above) is represented by using dotted lines in the image B of FIG. 14. Because the image B is a schematic planar diagram, the added 3D model looks like on a plane, but in an actual three-dimensional scene, the added 3D model has a specific thickness and volume. After the 3D model is added, the target virtual object passes through the portal to implement a switch between a current world and a target world, and as shown in the image C in FIG. 14, the target virtual object is already located in the world 2 at this moment. Then, as shown in the image D in FIG. 14, the target virtual object gradually moves away from the portal, and the added 3D model is deleted at this moment.

In addition, there is such a scene where one or more intermediate worlds (intermediate virtual scenes) exist between the world 1 and the world 2. Using one intermediate world 3 as an example, the intermediate world 3 is provided with a transparent portal at a position corresponding to the world 1. This is similar to, for example, adding an intermediate world (that is, the world 1) between the current world and the world 2 shown in FIG. 10, and in this case, a method of traveling from the world 1 to the world 2 is described below. FIG. 15 is a schematic diagram of traveling between two worlds with an intermediate world in between. Similar to FIG. 14, for ease of description, a specific traversal process is also described by using images A, B. C. and D in FIG. 15. First, in the image A of FIG. 15, the target virtual object is located in the world 1 currently, and intends to pass through a portal to reach the world 2. That is, the traveler wants to see the world 2. However, a world 3 exists between the world 1 and the world 2. Therefore, the traveler essentially sees the world 3, that is, the line of sight of the traveler passes through the world 3. In the image B of FIG. 15, the target virtual object is already close to the portal, and it may be considered that a relative position between the target virtual object and the portal meets a predetermined position relationship at this moment. Then, a 3D model similar to a door may be added on the periphery of the portal, and the added 3D model is represented by using dotted lines in the image B of FIG. 15. After the 3D model is added, the target virtual object passes through the portal to realize a switch between the current world and the target world. That is, as shown in the image C of FIG. 15, the target virtual object has actually reached the world 2, which is equivalent to a switch between the world 1 and the world 2. In this case, the target virtual object located in the world 2 may pass through the portal in the world 2 to reach the world 1 again, that is, the foregoing steps may be repeated. Then, the target virtual object gradually moves away from the portal as shown in the image D of FIG. 15, and the added 3D model is deleted.

Figure 14:
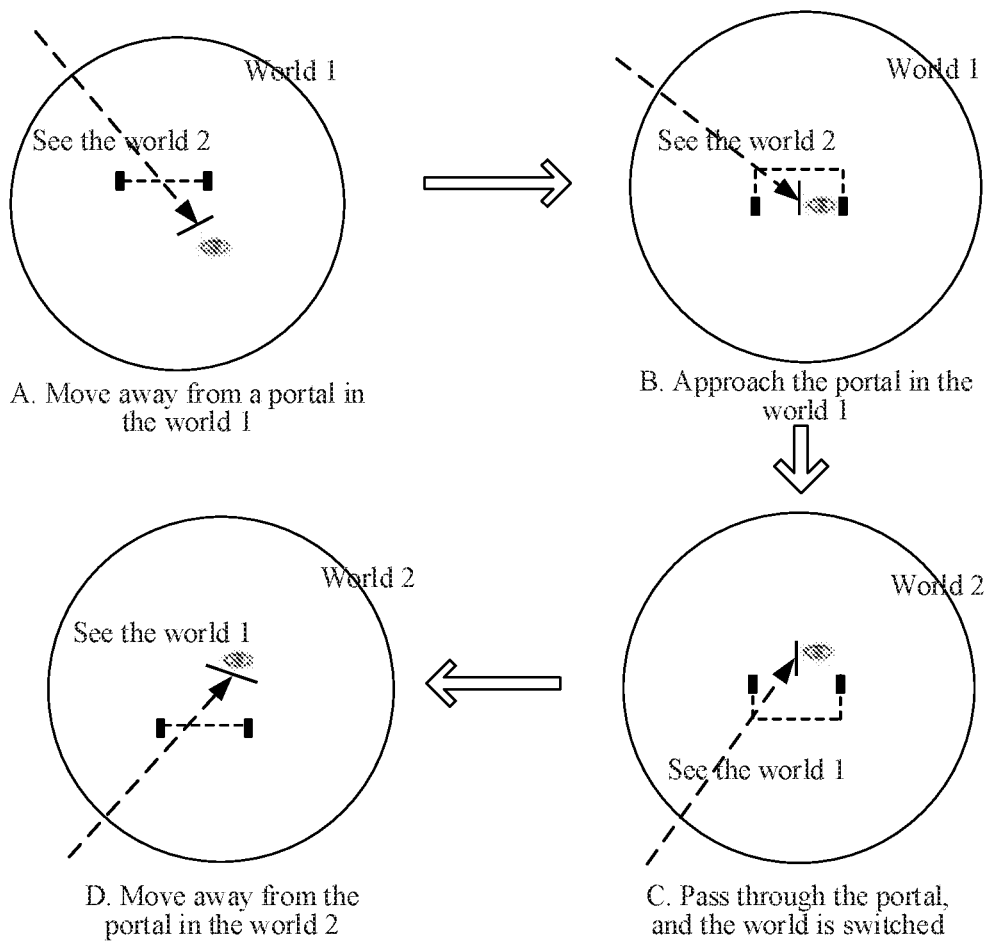
FIG. 14 is a schematic diagram of traveling between two worlds according to an embodiment of this application.
Figure 15:
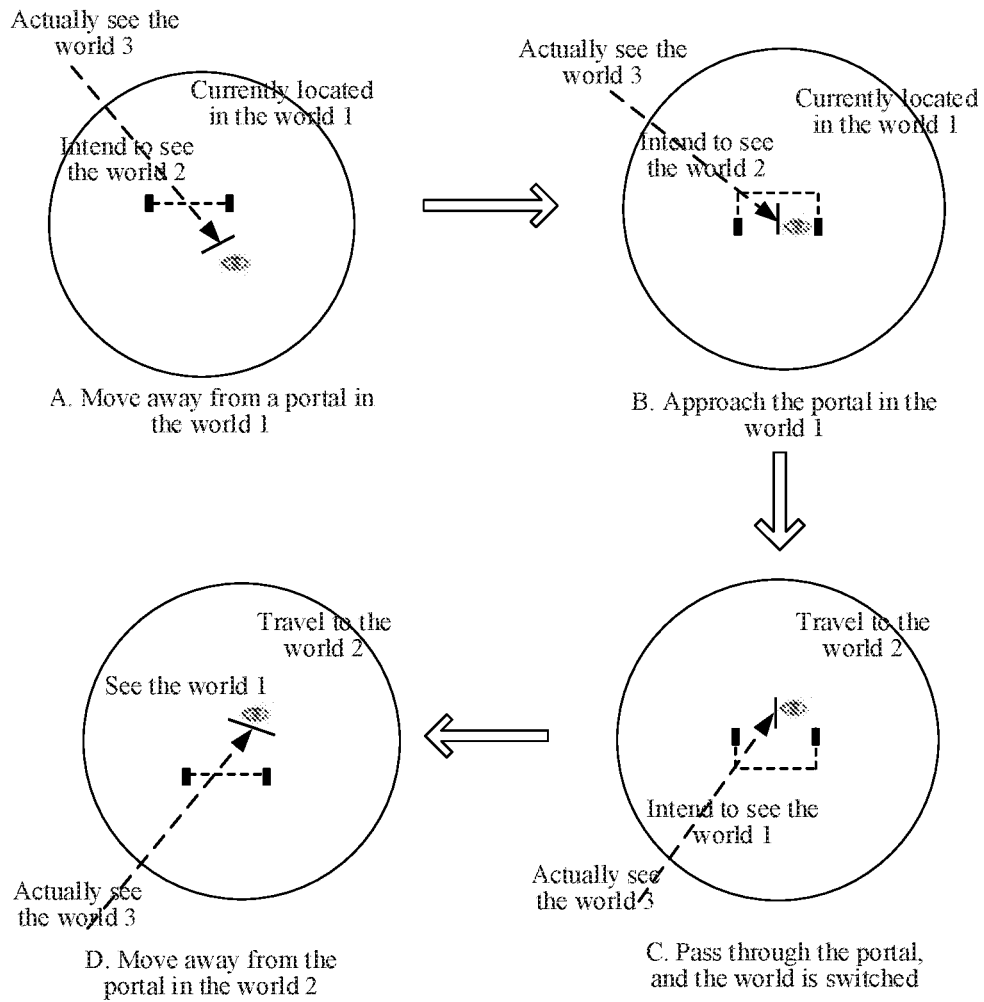
FIG. 15 is a schematic diagram of traveling between two worlds with an intermediate world in between according to an embodiment of this application.
Figure 16:
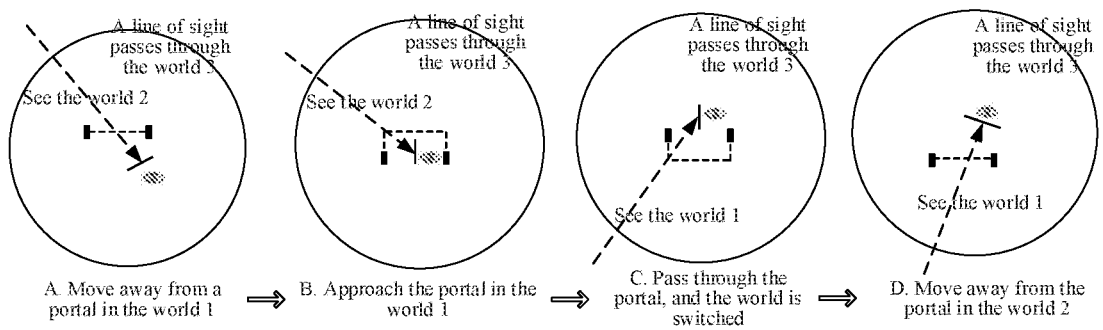
FIG. 16 is another schematic diagram of traveling between two worlds with an intermediate world in between according to an embodiment of this application.

Compared with the direct traversal process between two worlds (the world 1 and the world 2) shown in FIG. 14, in a traversal process between two worlds (the world 1 and the world 2) with an intermediate world (the world 3) in between, the line of sight of the target virtual object directly passes through the world 3, and an actual traversal process is still directly from the world 1 to the world 2. FIG. 16 is another schematic diagram of traveling between two worlds with an intermediate world in between. As shown in FIG. 16, for example, in the whole traversal process, the line of sight of the target virtual object always passes through the world 3. That is, even though the world 3 exists between the world 1 and the world 2, the target virtual object will not actually pass through the world 3 in the traversal process, but only the line of sight passes through the world 3. In this way, the target virtual object may quickly travel from the world 1 to the world 2 without being affected by the intermediate world 3, thereby implementing an unobstructed quick traversal, to further improve the traversal experience of the traveler.

In another possible implementation, a special effect model may be further added to each scene switching trigger, and a specific special effect may be set for each scene switching trigger by using the special effect model. In this way, the visual effect may be enhanced, and the service experience may be improved. In a specific implementation process, a corresponding special effect model may be determined according to the shape of the scene switching trigger, the special effect model may be selected according to the manner of selecting a target 3D model described above, and details are not described herein again. For example, a special effect similar to a fire wheel may be set for a circular scene switching trigger to perform special effect enhancement processing on the portal. In this way, the scene may look cooler, and the special effect model may be added according to the manner of adding a target 3D model described above.

In addition, using the special effect similar to a fire wheel as an example, both the periphery and the inner side of the fire wheel are provided with a flare. It is assumed that the fire wheel special effect is set in the portal 1 in the world 1. When a user directly faces the portal 1, the user may see a complete fire wheel effect, namely, both the flare effects of the inner side and the periphery of the fire wheel may be fully seen. However, when the user looks at the world 2 (the world 2 is a target virtual scene corresponding to the portal 1) from a side or standing at the edge of the portal 1, because a viewing angle of the user does not directly faces the portal, the flare special effect at some angles is invisible. For example, the flare special effect at the inner side is invisible at a certain angle. In this case, to enhance the visual experience of the user as much as possible, the world 2 may further be provided with a fire wheel special effect model with the same orientation at a position corresponding to the portal 1. In this way, even if the user views at a specific angle from the side, a visual effect as complete as possible may be implemented through the double special effects of the fire wheel special effect on the portal 1 and the fire wheel special effect at the corresponding position in the world 2, to improve the service experience of the user.

Based on the same inventive concept, an embodiment of this application provides a virtual scene switching apparatus. The virtual scene switching apparatus may be a terminal device that can realize functions of the terminal device in the foregoing virtual scene switching method, or the virtual scene switching apparatus may be an apparatus that can support a terminal device to realize the foregoing virtual scene switching method. The virtual scene switching apparatus may be a hardware structure, a software module, or a combination of the hardware structure and the software module. The virtual scene switching apparatus may be implemented by using a chip system, and the chip system may include a chip, or may include a chip and another discrete device.

Figure 17:
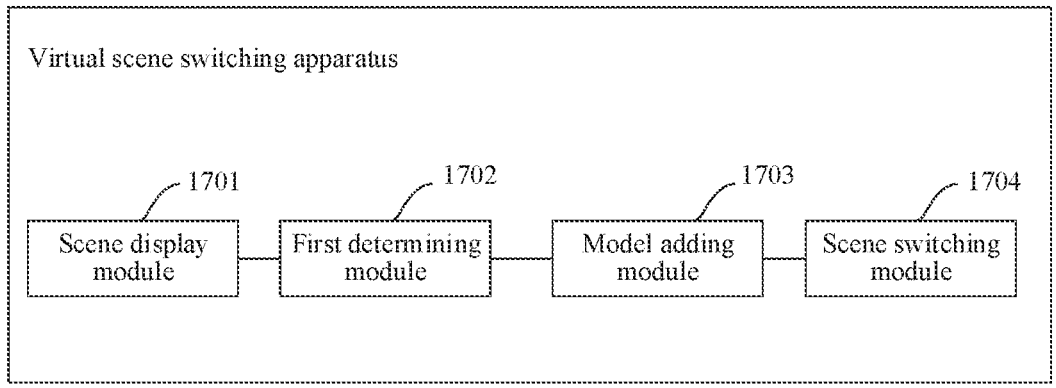
FIG. 17 is a structural block diagram of a virtual scene switching apparatus according to an embodiment of this application.

FIG. 17 is a structural block diagram of a virtual scene switching apparatus according to an embodiment of this application. Referring to FIG. 17, the virtual scene switching apparatus in this embodiment of this application may include one or more processors, and one or more memories storing a program unit, the program unit being executed by the processor and including a scene display module 1701, a first determining module 1702, a model adding module 1703, and a scene switching module 1704, where the scene display module 1701 is configured to display a current virtual scene and a first scene switching trigger set, a scene switching trigger being used for triggering a switch between different associated virtual scenes, and the first scene switching trigger set being a set of scene switching triggers triggering a switch from the current virtual scene to at least one associated virtual scene;

the first determining module 1702 is configured to determine, from the first scene switching trigger set, a target scene switching trigger of which a relative position to a target virtual object in the current virtual scene meets a predetermined position relationship;

the model adding module 1703 is configured to add a target 3D model with a shape matching that of the target scene switching trigger to a position of the target scene switching trigger, to lengthen, by using the target 3D model, a moving path passing through the target scene switching trigger; and the scene switching module 1704 is configured to switch from the current virtual scene to a target virtual scene corresponding to the target scene switching trigger on the basis that the target virtual object passes through the target scene switching trigger.

In a possible implementation, a thickness of the target 3D model in a moving direction of the target virtual object is greater than a predetermined thickness.

In a possible implementation, the predetermined thickness is determined according to a viewing angle range of the target virtual object in the current virtual scene and a distance between a camera and a near clipping plane, and the near clipping plane is a plane carrying image information of the current virtual scene.

In a possible implementation, the added target 3D model has a perspective effect.

Figure 18:
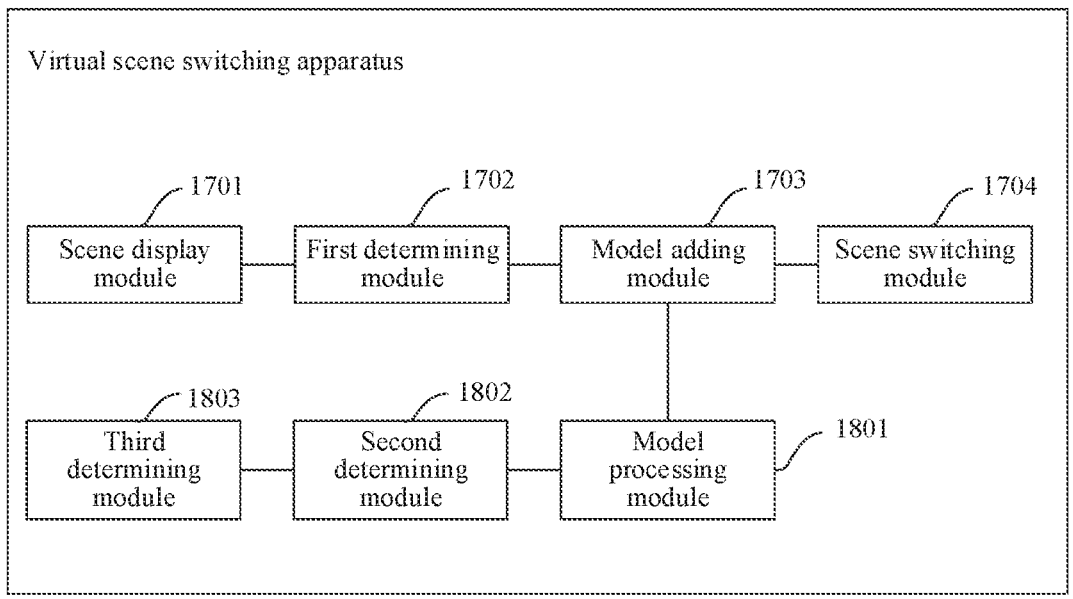
FIG. 18 is another structural block diagram of a virtual scene switching apparatus according to an embodiment of this application.

FIG. 18 is another structural block diagram of a virtual scene switching apparatus according to an embodiment of this application. In a possible implementation, referring to FIG. 18, the program unit in this embodiment of this application further includes a model processing module 1801 configured to:

after the scene switching module 1704 switches from the current virtual scene to the target virtual scene corresponding to the target scene switching trigger, delete the target 3D model, or hide the target 3D model.

In a possible implementation, the scene display module 1701 is further configured to:

render and display the target virtual scene; and display the target virtual object and a second scene switching trigger set in the target virtual scene, the second scene switching trigger set being a set of scene switching triggers triggering a switch from the current virtual scene to at least one associated virtual scene.

In a possible implementation, continue to refer to FIG. 18: the program unit in this embodiment of this application further includes a second determining module 1802 configured to:

before the model adding module 1703 adds the target 3D model with a shape matching that of the target scene switching trigger to the position of the target scene switching trigger, search a model base for a 3D model matching a trigger identifier of the target scene switching trigger as the target 3D model; or determine a shape and a size of the target scene switching trigger, and determine, from a model base, a 3D model with a highest degree of matching with the shape and the size as the target 3D model; or determine a plurality of historically added 3D models according to a historical model adding record of the target scene switching trigger, and determine the target 3D model from the plurality of historically added 3D models.

In a possible implementation, the second determining module 1802 is further configured to:

determine a group to which the target virtual object belongs, a plurality of virtual objects being classified into a plurality of groups according to role categories; and add, to the determined target 3D model, a group identifier special effect corresponding to the group to which the target virtual object belongs, to obtain a target 3D model added with the group identifier special effect.

In a possible implementation, the model adding module 1703 is configured to:

determine, according to a result of comparison between a size of the target 3D model and the size of the target scene switching trigger, a display position of the target 3D model relative to the target scene switching trigger; and display the target 3D model according to the determined display position.

In a possible implementation, continue to refer to FIG. 18: the program unit in this embodiment of this application further includes a third determining module 1803 configured to:

determine a corresponding special effect model according to a shape of at least one scene switching trigger, the at least one scene switching trigger belonging to the first scene switching trigger set; and add a corresponding special effect model to each scene switching trigger in the at least one scene switching trigger.

In a possible implementation, the third determining module 1803 is further configured to:

determine other target virtual scenes corresponding to the at least one scene switching trigger respectively; and add, for each of the other target virtual scenes, a same special effect model in the same orientation to a position corresponding to the corresponding scene switching trigger in the target virtual scene.

In a possible implementation, at least one intermediate virtual scene is provided between the current virtual scene and the target virtual scene, each intermediate virtual scene is provided with a scene switching trigger at a position corresponding to the target scene switching trigger, and the scene switching module 1704 is configured to:

travel, in a process that the target virtual object passes through the target scene switching trigger, from the current virtual scene to the target virtual scene through at least one intermediate virtual scene based on a sight of the target virtual object, to realize the switch from the current virtual scene to the target virtual scene.

Related content of the steps in the foregoing method embodiments of the virtual scene switching method may be referenced for the function descriptions of the corresponding functional modules in the embodiments of this application. Details are not described herein again.

Division of the modules in the embodiments of this application is only an example, and is merely logical function division. There may be other division manners during actual implementation. In addition, the functional modules in the embodiments of this application may be integrated into one processor, or each of the modules may exist alone physically, or two or more modules may be integrated into one module. The integrated modules may be implemented in a form of hardware, or may be implemented in a form of a software functional module.

Figure 19:
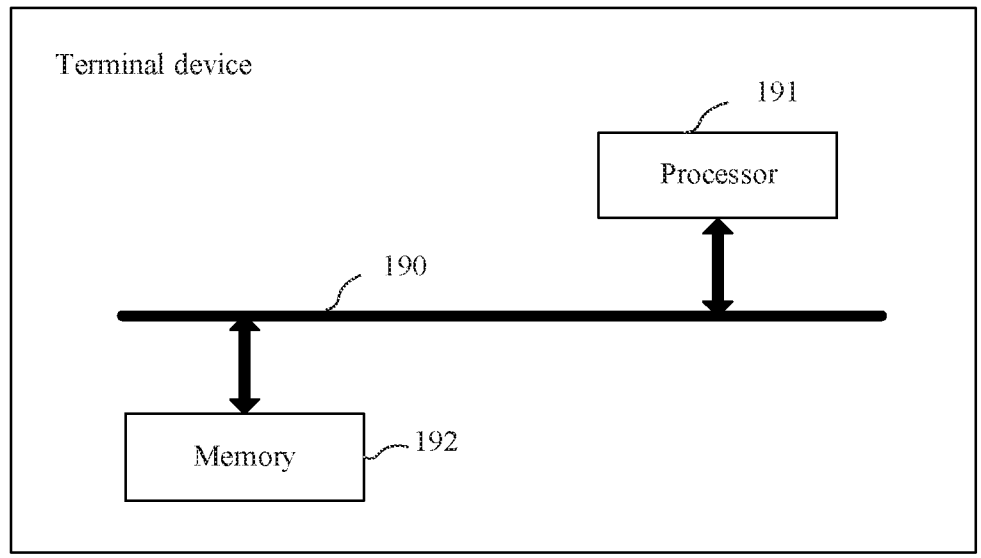
FIG. 19 is a schematic structural diagram of a terminal device according to an embodiment of this application.

FIG. 19 is a schematic structural diagram of a terminal device according to an embodiment of this application. Referring to FIG. 19, based on the same inventive concept, an embodiment of this application further provides a terminal device. The terminal device may be, for example, a smartphone, a tablet computer, a personal digital assistant (PDA), a notebook computer, an in-vehicle device, or a smart wearable device. The terminal device may be a hardware structure, a software module, or a combination of the hardware structure and the software module. The terminal device may be implemented by using a chip system, and the chip system may include a chip, or may include a chip and another discrete device.

The terminal device in this embodiment of this application includes at least one processor 191, and a memory 192 connected to the at least one processor. In this embodiment of this application, a specific connection medium between the processor 191 and the memory 192 is not limited. In FIG. 19, for example the processor 191 is connected to the memory 192 by using a bus 190, where the bus 190 is represented by using a thick line in FIG. 19. This is only an exemplary description, and connection manners between other components are not limited in this application. The bus 190 may be classified as an address bus, a data bus, a control bus, or the like. For ease of representation, only one thick line is used to represent the bus in FIG. 19, but this does not mean that there is only one bus or only one type of bus.

In this embodiment of this application, the memory 192 stores an instruction executable by the at least one processor 191, the at least one processor 191, by executing the instruction stored by the memory 192, may perform the steps included in the foregoing virtual scene switching method.

The processor 191 is the control center of the terminal device, and may be connected to various parts of the terminal device by using various interfaces and lines. By running or executing the instruction stored in the memory 192, and invoking data stored in the memory 192, the processor 191 performs various functions and data processing of the terminal device, thereby performing overall monitoring on the terminal device. Optionally, the processor 191 may include one or more processing units. The processor 191 may integrate an application processor and a modem processor. The application processor mainly processes an operating system, a user interface, an application, and the like. The modem processor mainly processes wireless communication. It may be understood that the modem processor may alternatively not be integrated into the processor 191. In some embodiments, the processor 191 and the memory 192 may be implemented on a single chip. In some embodiments, the processor 191 and the memory 192 may be separately implemented on independent chips.

The processor 191 may be a general purpose processor, such as a central processing unit (CPU), a digital signal processor (DSP), an application-specific integrated circuit (ASIC), a field programmable gate array (FPGA), or another programmable logic device, a discrete gate or transistor logic device, or a discrete hardware component. The processor 191 may implement or perform the methods, the steps, and logical block diagrams that are disclosed in the embodiments of this application. The general purpose processor may be a microprocessor or any conventional processor, or the like. Steps of the methods disclosed with reference to the embodiments of this application may be directly executed and completed by a hardware processor, or may be executed and completed by using a combination of hardware and software modules in the processor.

The memory 192, as a non-volatile computer-readable storage medium, may be configured to store a non-volatile software program, a non-volatile computer executable program and a module. The memory 192 may include at least one type of storage medium, and the storage medium may include a flash memory, a hard disk, a multimedia card, a card type memory, a random access memory (RAM), a static random access memory (SRAM), a programmable read-only memory (PROM), a read-only memory (ROM), an electrically erasable programmable read-only memory (EEPROM), a magnetic memory, a magnetic disk, an optical disc, or the like. The memory 192 is any other medium that can be configured to carry or store expected program code in a form of an instruction or a data structure and can be accessed by a computer, but is not limited thereto. The memory 192 in this embodiment of this application may alternatively be a circuit or any other apparatus that can implement a storage function and be configured to store a program instruction and/or data.

Figure 20:
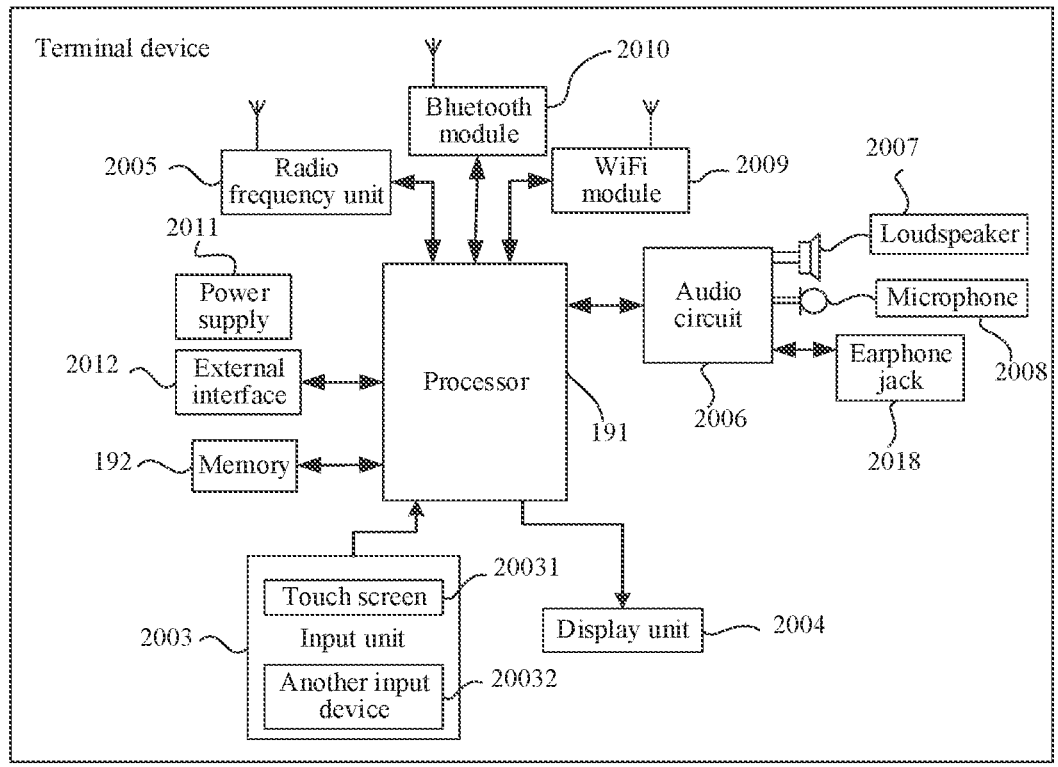
FIG. 20 is another schematic structural diagram of a terminal device according to an embodiment of this application.

FIG. 20 is another schematic structural diagram of a terminal device. The terminal device may further include components such as an input unit 2003, a display unit 2004, a radio frequency unit 2005, an audio circuit 2006, a loudspeaker 2007, a microphone 2008, a wireless fidelity (Wi-Fi) module 2009, a Bluetooth module 2010, a power supply 2011, an external interface 2012, and an earphone jack 2018. A person skilled in the art may understand that FIG. 20 is merely an example of the terminal device, and does not constitute a limitation to the terminal device, and the terminal device may include more or fewer components than those shown in the figure, or some components may be combined, or different components may be used.

The input unit 2003 may be configured to receive input digit or character information, and generate a key signal input related to the user setting and function control of the terminal device. For example, the input unit 2003 may include a touch screen 20031 and another input device 20032. The touch screen 20031 may collect a touch operation of a user on or near the touch screen (such as an operation of the user on or near the touch screen 20031 by using any suitable object such as a finger, a joint, or a stylus), namely, the touch screen 20031 may be configured to detect touch pressure, a touch input position, and a touch input area, and drive a corresponding connection apparatus according to a preset program. The touch screen 20031 may detect a touch operation of the user on the touch screen 20031, convert the touch operation into a touch signal and transmit the signal to the processor 191, or may be understood as transmitting touch information of the touch operation to the processor 191, and receiving and executing a command transmitted by the processor 191. The touch information includes at least one of pressure magnitude information and pressure duration information. The touch screen 20031 may provide an input interface and an output interface between the terminal device and the user. In addition, the touch screen 20031 may be implemented in various types such as a resistance type, a capacitance type, an infrared type, and a surface acoustic wave type. In addition to the touch screen 20031, the input unit 2003 may further include another touch screen 20032. For example, the touch screen 20032 may include, but is not limited to, one or more of a physical keyboard, a functional key (such as a volume control key or a switch key), a track ball, a mouse, and a joystick.

The display unit 2004 may be configured to display information entered by the user or information provided for the user, and various menus of the terminal device. Further, the touch screen 20031 may cover the display unit 2004. After detecting a touch operation on or near the touch screen 20031, the touch screen transfers the touch operation to the processor 191 to determine pressure information of the touch operation. In the embodiments of this application, the touch screen 20031 and the display unit 2004 may be integrated into one component to implement the input, output, and display functions of the terminal device. For ease of description, the touch screen 20031 that represents a function set of the touch screen 20031 and the display unit 2004 is used as an example for description in the embodiments of this application. Apparently, in some embodiments, the touch screen 20031 and the display unit 2004 may alternatively be used as two separate components.

When the display unit 2004 and the touch panel are superposed in the form of layers to form the touch screen 20031, the display unit 2004 may be used as an input apparatus and an output apparatus. When the display unit is used as an output apparatus, the display unit may be configured to display an image, to implement the play of various videos. The display unit 2004 may include at least one of a liquid crystal display (LCD), a thin film transistor LCD (TFT-LCD), an organic light-emitting diode (OLED) display, an active matrix OLED (AMOLED) display, an in-plane switching (IPS) display, a flexible display, a 3D display, and the like. Some of these displays may be constructed to be transparent to allow the user to watch from the outside, and these displays may be referred to as transparent displays. According to a specific desired implementation, the terminal device may include two or more display units (or another display apparatus). For example, the terminal device may include an external display unit (not shown in FIG. 20) and an internal display unit (not shown in FIG. 20).

The radio frequency unit 2005 may be configured to receive and send signals during an information receiving and sending process or a call process. Generally, a radio frequency circuit includes, but is not limited to, an antenna, at least one amplifier, a transceiver, a coupler, a low noise amplifier (LNA), and a duplexer. In addition, the radio frequency unit 2005 may further communicate with a network device and another device through wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The audio circuit 2006, the loudspeaker 2007, and the microphone 2008 may provide audio interfaces between the user and the terminal device. The audio circuit 2006 may convert received audio data into an electrical signal and transmit the electrical signal to the loudspeaker 2007. The loudspeaker 2007 converts the electrical signal into a sound signal and outputs the sound signal. On the other hand, the microphone 2008 converts a collected sound signal into an electrical signal. The audio circuit 2006 receives the electrical signal and then converts the electrical signal into audio data, and outputs the audio data to the processor 191 for processing. Then, the processor 191 sends the audio data to, for example, another electronic device by using the radio frequency unit 2005, or outputs the audio data to the memory 192 for further processing. The audio circuit may further include an earphone jack 2018, configured to provide a connection interface between the audio circuit and an earphone.

Wi-Fi belongs to a short distance wireless transmission technology. The terminal device may help, by using the Wi-Fi module 2009, a user to receive and send an email, browse a web page, access stream media, and the like. This provides wireless broadband Internet access for the user. Although FIG. 20 shows the Wi-Fi module 2009, it may be understood that the Wi-Fi module is not an essential component of the terminal device, and the Wi-Fi module may be omitted as required, provided that the scope of the essence of the present disclosure is not changed.

Bluetooth is a short distance wireless technology. By using the Bluetooth technology, communication between mobile communication terminal devices such as a palmtop computer, a notebook computer, and a mobile phone may be effectively simplified, and communication between these devices and the Internet may also be successfully simplified. The terminal device makes data transmission between the terminal devices and the Internet become faster and more efficient by using the Bluetooth module 2010, to broaden the bandwidth for wireless communication. The Bluetooth technology is an open solution for implementing wireless communication of voice and data. Although FIG. 20 shows the Bluetooth module 2010, it may be understood that the Bluetooth module is not an essential component of the terminal device, and the Bluetooth module may be omitted as required, provided that the scope of the essence of the present disclosure is not changed.

The terminal device may further include a power supply 2011 (for example, a battery), configured to receive external power or supply power for components in the terminal device. Preferably, the power supply 2011 may be logically connected to the processor 191 by using a power management system, thereby implementing functions such as charging, discharging, and power consumption management by using the power management system.

The terminal device may further include an external interface 2012. The external interface 2012 may include a standard Micro USB interface, or may include a multi-pin connector, and may be configured to connect the terminal device to another device for communication, or may be configured to connect to a charger to charge the terminal device.

Although not shown in the figure, the terminal device may further include other possible functional modules such as a camera, a flashlight, and the like, and details are not described herein again.

Based on the same inventive concept, an embodiment of this application further provides a storage medium, storing a computer instruction, the computer instruction, when run on a computer, causing the computer to perform the steps of the foregoing virtual scene switching method.

Based on the same inventive concept, an embodiment of this application further provides a virtual scene switching apparatus, including at least one processor and a readable storage medium, instructions included in the storage medium, when being executed by the at least one processor, causing the processor to perform steps of the foregoing virtual scene switching method.

Based on the same inventive concept, an embodiment of this application further provides a chip system, the chip system includes a processor, and may further include a memory, and the chip system is configured to implement the steps of the foregoing virtual scene switching method. The chip system may include a chip, or may include a chip and another discrete device.

In some possible implementation, the various aspects of the virtual scene switching method provided in the embodiments of this application may be further implemented in a program product form including program code. The program code is configured to, when run on a computer, cause the computer to perform the steps of the virtual scene switching method described according to the exemplary implementations of this application.

Based on the same inventive concept, an embodiment of this application further provides a virtual scene switching apparatus, including: a memory, configured to store a program instruction, a processor, configured to invoke the program instruction stored in the memory, and perform, according to the obtained program instruction, the steps of the virtual scene switching method described according to various exemplary implementations of this application.

A person skilled in the art is to understand that the embodiments of this application may be provided as a method, a system, or a computer program product. Therefore, the embodiments of this application may use a form of hardware-only embodiments, software-only embodiments, or embodiments with a combination of software and hardware. In addition, the embodiments of this application may adopt one or more forms of computer program products implemented on a computer-usable storage medium (including but not limited to a magnetic disk memory, an optical memory, and the like) including computer-usable program code.

This application is described with reference to flowcharts and/or block diagrams of the method, the device (system), and the computer program product in the embodiments of this application. It is to be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may alternatively be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the other programmable devices, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of the embodiments of this application. In this way, if these modifications and variations made to the embodiments of this application fall within the scope of the claims of this application and equivalent technologies thereof, this application also intends to include these changes and variations.

INDUSTRIAL APPLICABILITY

In the embodiments of this application, when it is determined that a relative position between a target virtual object and a target scene switching trigger meets a predetermined position relationship, it may be determined that the target virtual object may intend to pass through the target scene switching trigger. In this case, a target 3D model may be added to a position of the target scene switching trigger, and a moving path of the target virtual object passing through the target scene switching trigger is lengthened in a manner similar to thickening the target scene switching trigger, which is similar to adding a shielding small house or another shelter to the target scene switching trigger by using the target 3D model, to implicitly increase the thickness of the target scene switching trigger, and reducing or even eliminating an abrupt feeling during a traversal, thereby allowing the target virtual object to experience an immersive traversal and improving the traversal experience.

What is claimed is:

1. A virtual scene switching method, performed by a terminal device having a processor and memory storing a plurality of computer programs to be executed by the processor, the method comprising:
    displaying, by the terminal device, a current virtual scene and a first scene switching trigger set, a scene switching trigger being used for triggering a switch between different associated virtual scenes, and the first scene switching trigger set being a set of scene switching triggers triggering a switch from the current virtual scene to at least one associated virtual scene;
    determining, by the terminal device, from the first scene switching trigger set, a target scene switching trigger of which a relative position to a target virtual object in the current virtual scene meets a predetermined position relationship;
    adding, by the terminal device, a target 3D model with a shape matching that of the target scene switching trigger to a position of the target scene switching trigger, to lengthen, by using the target 3D model, a moving path passing through the target scene switching trigger; and
    switching, by the terminal device, from the current virtual scene to a target virtual scene corresponding to the target scene switching trigger on the basis that the target virtual object passes through the target scene switching trigger.

2. The method according to claim 1, wherein a thickness of the target 3D model in a moving direction of the target virtual object is greater than a predetermined thickness, the predetermined thickness is determined according to a viewing angle range of the target virtual object in the current virtual scene and a distance between a camera and a near clipping plane, and the near clipping plane is a plane carrying image information of the current virtual scene.

3. The method according to claim 1, wherein the target 3D model is provided with a perspective effect.

4. The method according to claim 1, wherein after the switching from the current virtual scene to a target virtual scene corresponding to the target scene switching trigger, the method further comprises:
    deleting, by the terminal device, the target 3D model, or hiding the target 3D model.

5. The method according to claim 1, wherein the switching from the current virtual scene to a target virtual scene corresponding to the target scene switching trigger comprises:
    rendering and displaying the target virtual scene; and
    displaying the target virtual object and a second scene switching trigger set in the target virtual scene, the second scene switching trigger set being a set of scene switching triggers triggering a switch from the current virtual scene to at least one associated virtual scene.

6. The method according to claim 1, wherein before the adding, by the terminal device, a target 3D model with a shape matching that of the target scene switching trigger to a position of the target scene switching trigger, the method further comprises:
    searching, by the terminal device, a model base for a 3D model matching a trigger identifier of the target scene switching trigger as the target 3D model; or
    determining, by the terminal device, a shape and a size of the target scene switching trigger, and determining a 3D model with a highest degree of matching with the shape and the size from a model base as the target 3D model; or
    determining, by the terminal device, a plurality of historically added 3D models according to a historical model adding record of the target scene switching trigger, and determining the target 3D model from the plurality of historically added 3D models.

7. The method according to claim 6, wherein the method further comprises:
    determining, by the terminal device, a group to which the target virtual object belongs, a plurality of virtual objects being classified into a plurality of groups according to role categories; and
    adding, by the terminal device, to the determined target 3D model, a group identifier special effect corresponding to the group to which the target virtual object belongs, to obtain a target 3D model added with the group identifier special effect.

8. The method according to claim 6, wherein the adding, by the terminal device, a target 3D model with a shape matching that of the target scene switching trigger to a position of the target scene switching trigger comprises:
    determining, according to a result of comparison between a size of the target 3D model and the size of the target scene switching trigger, a display position of the target 3D model relative to the target scene switching trigger; and
    displaying the target 3D model according to the determined display position.

9. The method according to claim 1, wherein the method further comprises:
    determining, by the terminal device, a corresponding special effect model according to a shape of at least one scene switching trigger, the at least one scene switching trigger belonging to the first scene switching trigger set; and
    adding, by the terminal device, a corresponding special effect model to each scene switching trigger in the at least one scene switching trigger.

10. The method according to claim 9, wherein the method further comprises:
    determining, by the terminal device, other target virtual scenes corresponding to the at least one scene switching trigger respectively; and
    adding, by the terminal device for each of the other target virtual scenes, a same special effect model in the same orientation to a position corresponding to the corresponding scene switching trigger in the target virtual scene.

11. The method according to claim 1, wherein at least one intermediate virtual scene is provided between the current virtual scene and the target virtual scene, each intermediate virtual scene is provided with a scene switching trigger at a position corresponding to the target scene switching trigger, and the switching, by the terminal device, from the current virtual scene to a target virtual scene corresponding to the target scene switching trigger on the basis that the target virtual object passes through the target scene switching trigger comprises:

traveling, in a process that the target virtual object passes through the target scene switching trigger, from the current virtual scene to the target virtual scene through at least one intermediate virtual scene based on a sight of the target virtual object, to realize the switch from the current virtual scene to the target virtual scene.

12. A terminal device, the terminal device comprising:
a processor; and
memory connected to the processor, the memory storing a plurality of computer programs that, when executed by the processor, cause the terminal device to perform a plurality of operations including:

displaying, by the terminal device, a current virtual scene and a first scene switching trigger set, a scene switching trigger being used for triggering a switch between different associated virtual scenes, and the first scene switching trigger set being a set of scene switching triggers triggering a switch from the current virtual scene to at least one associated virtual scene;

determining, by the terminal device, from the first scene switching trigger set, a target scene switching trigger of which a relative position to a target virtual object in the current virtual scene meets a predetermined position relationship;

adding, by the terminal device, a target 3D model with a shape matching that of the target scene switching trigger to a position of the target scene switching trigger, to lengthen, by using the target 3D model, a moving path passing through the target scene switching trigger, and switching, by the terminal device, from the current virtual scene to a target virtual scene corresponding to the target scene switching trigger on the basis that the target virtual object passes through the target scene switching trigger.

13. The terminal device according to claim 12, wherein a thickness of the target 3D model in a moving direction of the target virtual object is greater than a predetermined thickness, the predetermined thickness is determined according to a viewing angle range of the target virtual object in the current virtual scene and a distance between a camera and a near clipping plane, and the near clipping plane is a plane carrying image information of the current virtual scene.

14. The terminal device according to claim 12, wherein after the switching from the current virtual scene to a target virtual scene corresponding to the target scene switching trigger, the method further comprises:

deleting, by the terminal device, the target 3D model, or hiding the target 3D model.

15. The terminal device according to claim 12, wherein the switching from the current virtual scene to a target virtual scene corresponding to the target scene switching trigger comprises:

rendering and displaying the target virtual scene; and
displaying the target virtual object and a second scene switching trigger set in the target virtual scene, the second scene switching trigger set being a set of scene switching triggers triggering a switch from the current virtual scene to at least one associated virtual scene.

16. The terminal device according to claim 12, wherein before the adding, by the terminal device, a target 3D model with a shape matching that of the target scene switching trigger to a position of the target scene switching trigger, the method further comprises:

searching, by the terminal device, a model base for a 3D model matching a trigger identifier of the target scene switching trigger as the target 3D model; or determining, by the terminal device, a shape and a size of the target scene switching trigger, and determining a 3D model with a highest degree of matching with the shape and the size from a model base as the target 3D model; or determining, by the terminal device, a plurality of historically added 3D models according to a historical model adding record of the target scene switching trigger, and determining the target 3D model from the plurality of historically added 3D models.

17. The terminal device according to claim 16, wherein the plurality of operations further comprise:

determining, by the terminal device, a group to which the target virtual object belongs, a plurality of virtual objects being classified into a plurality of groups according to role categories; and adding, by the terminal device, to the determined target 3D model, a group identifier special effect corresponding to the group to which the target virtual object belongs, to obtain a target 3D model added with the group identifier special effect.

18. The terminal device according to claim 12, wherein the plurality of operations further comprise:

determining, by the terminal device, a corresponding special effect model according to a shape of at least one scene switching trigger, the at least one scene switching trigger belonging to the first scene switching trigger set; and adding, by the terminal device, a corresponding special effect model to each scene switching trigger in the at least one scene switching trigger.

19. The terminal device according to claim 12, wherein at least one intermediate virtual scene is provided between the current virtual scene and the target virtual scene, each intermediate virtual scene is provided with a scene switching trigger at a position corresponding to the target scene switching trigger, and the switching, by the terminal device, from the current virtual scene to a target virtual scene corresponding to the target scene switching trigger on the basis that the target virtual object passes through the target scene switching trigger comprises:

traveling, in a process that the target virtual object passes through the target scene switching trigger, from the current virtual scene to the target virtual scene through at least one intermediate virtual scene based on a sight of the target virtual object, to realize the switch from the current virtual scene to the target virtual scene.

20. A non-transitory computer-readable storage medium, storing a plurality of computer programs that, when executed by a processor of a terminal device, cause the terminal device to perform a plurality of operations including:

displaying, by the terminal device, a current virtual scene and a first scene switching trigger set, a scene switching trigger being used for triggering a switch between different associated virtual scenes, and the first scene switching trigger set being a set of scene switching triggers triggering a switch from the current virtual scene to at least one associated virtual scene;

determining, by the terminal device, from the first scene switching trigger set, a target scene switching trigger of which a relative position to a target virtual object in the current virtual scene meets a predetermined position relationship;

adding, by the terminal device, a target 3D model with a shape matching that of the target scene switching trigger to a position of the target scene switching trigger, to lengthen, by using the target 3D model, a moving path passing through the target scene switching trigger; and switching, by the terminal device, from the current virtual scene to a target virtual scene corresponding to the target scene switching trigger on the basis that the target virtual object passes through the target scene switching trigger.

\* \* \* \* \*